(12) United States Patent
Eguchi et al.

(10) Patent No.: US 6,772,643 B2
(45) Date of Patent: Aug. 10, 2004

(54) FLOW METER

(75) Inventors: Osamu Eguchi, Nara (JP); Koichi Takemura, Nara (JP); Shuji Ab, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/410,529

(22) Filed: Apr. 9, 2003

(65) Prior Publication Data

US 2004/0020307 A1 Feb. 5, 2004

(30) Foreign Application Priority Data

Aug. 5, 2002 (JP) ........................................ 2002-227101
Aug. 7, 2002 (JP) ........................................ 2002-229735

(51) Int. Cl.[7] .................................................. G01F 1/66
(52) U.S. Cl. ............................. 73/861.28; 73/861.27; 702/51
(58) Field of Search ...................... 73/861.28, 861.27, 73/861.31, 861.29; 702/51, 45, 50, 55

(56) References Cited

U.S. PATENT DOCUMENTS

| | | | | |
|---|---|---|---|---|
| 3,641,817 A | * | 2/1972 | Dory | 73/861.28 |
| 4,509,372 A | * | 4/1985 | Mount | 73/861.28 |
| 6,625,549 B1 | * | 9/2003 | Nawa et al. | 702/51 |

FOREIGN PATENT DOCUMENTS

| | | |
|---|---|---|
| JP | 54-7381 | 1/1979 |
| JP | 54-18788 | 2/1979 |
| JP | 54-41783 | 4/1979 |
| JP | 61-008621 | 1/1986 |
| JP | 61-274221 | 12/1986 |
| JP | 08-304133 | 11/1996 |
| JP | 10-142019 | 5/1998 |
| JP | 11-051724 | 2/1999 |
| JP | 2000-065614 | 3/2000 |
| JP | 2001-255187 | 9/2001 |
| JP | 2002-333356 | 11/2002 |
| JP | 2002-340641 | 11/2002 |
| JP | 2002-365110 | 12/2002 |

* cited by examiner

*Primary Examiner*—Harshad Patel
(74) *Attorney, Agent, or Firm*—RatnerPrestia

(57) ABSTRACT

A flow meter measures a flow rate of fluid flowing through a flow passage based on a duration of propagation of an ultrasonic wave along the flow passage. A signal of the received ultrasonic wave is then compared with a reference voltage to detect an arrival of the ultrasonic wave. A voltage setting unit determines the reference voltage to an appropriate level according to a signal output from a propagation measuring unit which measures a duration of propagation of the ultrasonic wave along the flow passage from the start of transmission of the ultrasonic wave to the output of a signal from a judging unit as the reference voltage being changed. The reference voltage is determined readily and accurately, the flow meter measures the flow rate with the appropriate reference voltage.

11 Claims, 22 Drawing Sheets

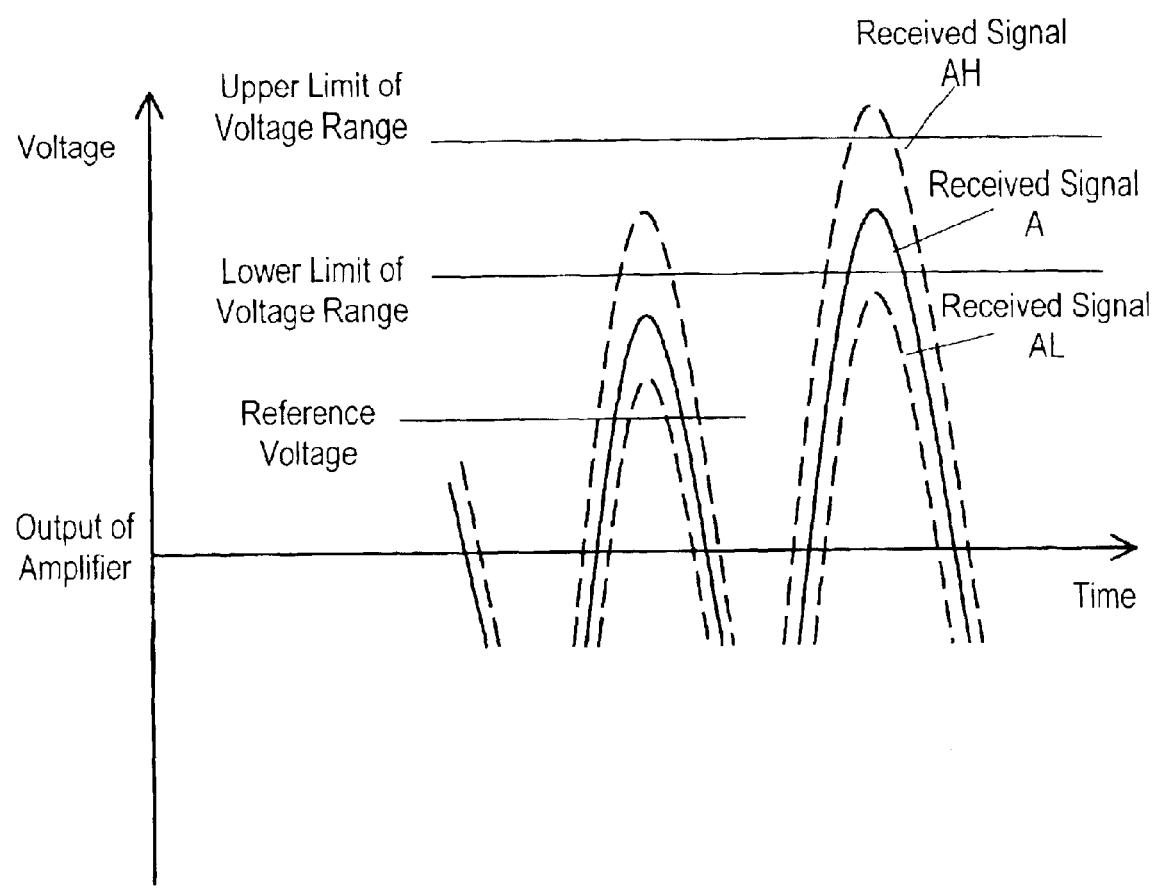

FLOW METER

FIELD OF THE INVENTION

The present invention relates to a flow meter for measuring a flow rate of fluid, such as a gas, with ultrasonic waves.

BACKGROUND OF THE INVENTION

FIG. 20 illustrates a conventional flow meter. A first ultrasonic oscillator 32 and a second ultrasonic oscillator 33 provided across a flow passage 31 in which fluid, such as gas, flows transmit and receive ultrasonic wave. A switch unit 34 switches transmitting and receiving operations of the ultrasonic oscillators. A transmitter 35 drives one of the first and second ultrasonic oscillators 32 and 33 to transmit an ultrasonic wave. An amplifier 34 amplifies an ultrasonic wave received by the other oscillator through the switching unit 34 to a predetermined amplitude. A reference comparator 37 compares a voltage of the signal amplified by the amplifier 36 with the amplitude of a reference voltage. A judging unit 38 outputs a signal D upon detecting the first zero-crossing point Ta of the detection signal in time after the comparator 37 detects that the received signal is larger than the reference voltage, as shown in FIG. 21. A repeating unit 39 counts the number of the signals D received from the judging unit 38 and simultaneously transfers the signals D to a controller 42. A time counter 40 measuring a duration of time before the repeating unit 39 counts the signals up to a predetermined number. A flow-rate calculator 41 calculates a flow-rate of the fluid from an output signal of the time counter 40. The controller 42 controls the transmitter 35 according to signals from the flow-rate calculator 41 and the repeating unit 39.

An operation of the conventional flow meter will be described in more detail. First, the controller 42 drives the transmitter 35 and the switching unit 34 to start transmitting an ultrasonic wave from the first ultrasonic wave oscillator 32. The ultrasonic wave is then propagated through fluid and is received by the second ultrasonic wave oscillator 33, and is then amplified by the amplifier 36. The reference comparator 37 outputs a signal C falling when the output signal of the amplifier 36 become larger than the reference voltage. The judging unit 38 outputs a signal D falling at the first zero-crossing point Ta in time after the output signal of the amplifier 36 becomes larger than the reference voltage. The repeating unit 39 transfers the signal D from the judging unit 38 to the controller 42. This operation is repeated N times predetermined, and the duration of the repeating is measured by the time counter 40. Then, the switching unit 34 switches the transmission of the ultrasonic signal from the first ultrasonic wave oscillator 32 to the second ultrasonic wave oscillator 33, and then, the same procedures are executed. The flow-rate calculator 41 receives, from the time counter 40, the duration in a forward direction from an upstream to a downstream of the fluid and the duration in a reverse direction from the downstream to the upstream of the fluid, and calculates a flow rate Q by:

$$Q = K \cdot S \cdot v = K \cdot S \cdot L/2 \cdot (n/t1 - n/t2) \cdot \cos \phi \quad \text{(Equation 1)}$$

where L is an effective distance in a flowing direction of the fluid between the ultrasonic wave oscillators 32 and 33, t1 is the duration of the signal D transmitted N times in the forward direction, t2 is the duration of the signal D transmitted N times in the reverse direction, v is a measured velocity of the fluid, S is a cross section of the flow passage, $\phi$ is an angle formed by a line extending between the ultrasonic wave oscillators 32, 33 and the flowing direction, and K is a constant determined according to the flow rate.

The amplifier 36 has its gain adjusted such that the signal received by the ultrasonic wave oscillator is output at a constant amplitude, and peak values range in a predetermined range. More specifically, while the repeating unit 39 counts the number of the signals D up to the predetermined number, the number of times that the peak of the received signal is smaller than the lower limit of a predetermined-voltage range, as shown by dotted line AL in FIG. 22 is counted, and the number of times that the peak of the received signal is larger than the upper limit of the range, as shown by dotted line AH in FIG. 22, is counted. According to the counted numbers, the gain for the subsequence measuring of flow rate is determined. For example, if the number of times that the peak of the received signal is smaller than the lower limit is greater than the number of times that the peak of the received signal is larger than the upper limit, the gain is increased so that the peaks of the received signal denoted by real line A in FIG. 22 stay between the upper limit and the lower limit of the range.

The reference voltage of the reference comparator 37 to be compared with the voltage of the signal from the amplifier 36 is determined for the judging unit 38 to detect the position of zero crossing. More particularly, as shown in FIG. 21, the reference voltage is determined to be a substantial middle between the second peak and the third peak of the received signal in time, thus enabling the judging unit 38 to detect the first zero-crossing point Ta in time after the third peak P3. This assures a margin against the case that the second peak P2 increases or the third peak P3 declines according to a change in the flow rate or a temperature, thus allowing the judging unit 38 to detect the zero-crossing point Ta.

In the conventional flow meter having the above arrangement, the reference voltage to be compared with the voltage of the received signal amplified to a desired voltage is determined by resistance-voltage division implemented by a fixed resistor and a variable resistor. The division however requires the variable resistor to be manually adjusted for determining the reference voltage while monitoring the voltage, thus taking a considerable length of time and possibly creating an error in the adjusting. Further, the reference voltage remains unchanged during the measurement of the flow rate, and the gain of the amplifier for amplifying the received signal is fixed. Therefore, the voltage of the received ultrasonic wave varies during the measurement, and the relationship between the voltage and the reference voltage may accordingly change. For example, when the received signal significantly declines in its amplitude, the third peak P3 used for detecting the arrival of the wave may not reach the reference voltage. Accordingly, the reference comparator may output the signal C at the timing of the fourth peak P4, thus causing the judging unit to detect the first zero-crossing point after the fourth peak P4. As the result, the time counter measures the duration incorrectly, thus permitting the flow-rate calculator to calculate a incorrect flow rate.

SUMMARY OF THE INVENTION

A flow meter measures a flow rate of fluid flowing through a flow passage. The flow meter includes first and second oscillators provided across the flow passage for transmitting and receiving an ultrasonic wave, a transmitter for driving the first and second oscillators, a switching unit for switching transmission of the ultrasonic wave between the first and second oscillators, an amplifier for amplifying a signal received from the first and second oscillators, a flow-rate calculator for calculating the flow rate based on a duration of propagation of the ultrasonic wave between the first and second oscillators, a reference comparator for comparing a voltage of the amplified signal with a reference voltage to output a signal which indicates a time point where a relationship between the voltage of the amplified signal and the reference voltage changes, a judging unit for detecting an arrival time of the ultrasonic wave at the first and second oscillators based on the signal output from the reference comparator and the signal output from the amplifier to output a signal which indicates the arrival time, and a reference setting unit. The reference setting unit includes a propagation measuring unit for measuring a duration of propagation of the ultrasonic wave along the flow passage from a start of transmission of the ultrasonic wave to the arrival time detected by the judging unit, and a voltage setting unit for determining the reference voltage based on the duration of propagation and for the reference voltage to the reference comparator.

In the flow meter, the reference voltage is automatically set to a level assuring a margin against a change in the amplitude of the received signal, and the reference voltage is determined readily and accurately according to a change in the amplitude of the received signal during the measurement of the flow rate. This allows the judging unit to precisely detect a desired point or the first zero-crossing point in time after a desired point, e.g. the third peak P3 of the received signal, thus enabling the flow meter to measure the flow rate accurately against a change in the amplitude of the received signal.

BRIEF DESCRIPTION OF THE DRAWINGS

FIG. 22 is an explanatory view for illustrating an operation of the conventional flow meter.

DESCRIPTION OF THE PREFERRED EMBODIMENTS (Exemplary Embodiment 1)

Figure 1:
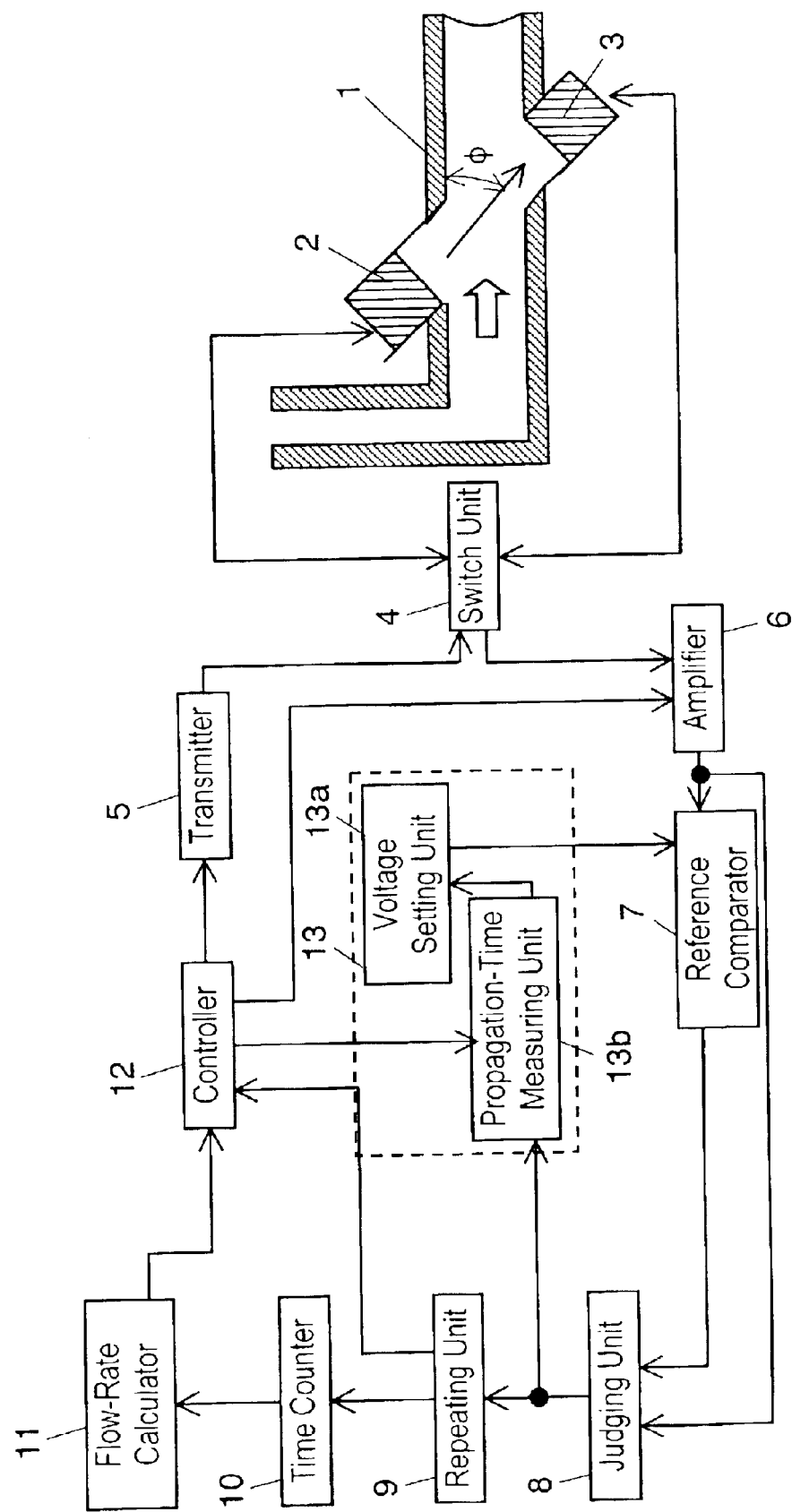
FIG. 1 is a block diagram of a flow meter according to exemplary embodiment 1 of the present invention.
Figure 2:
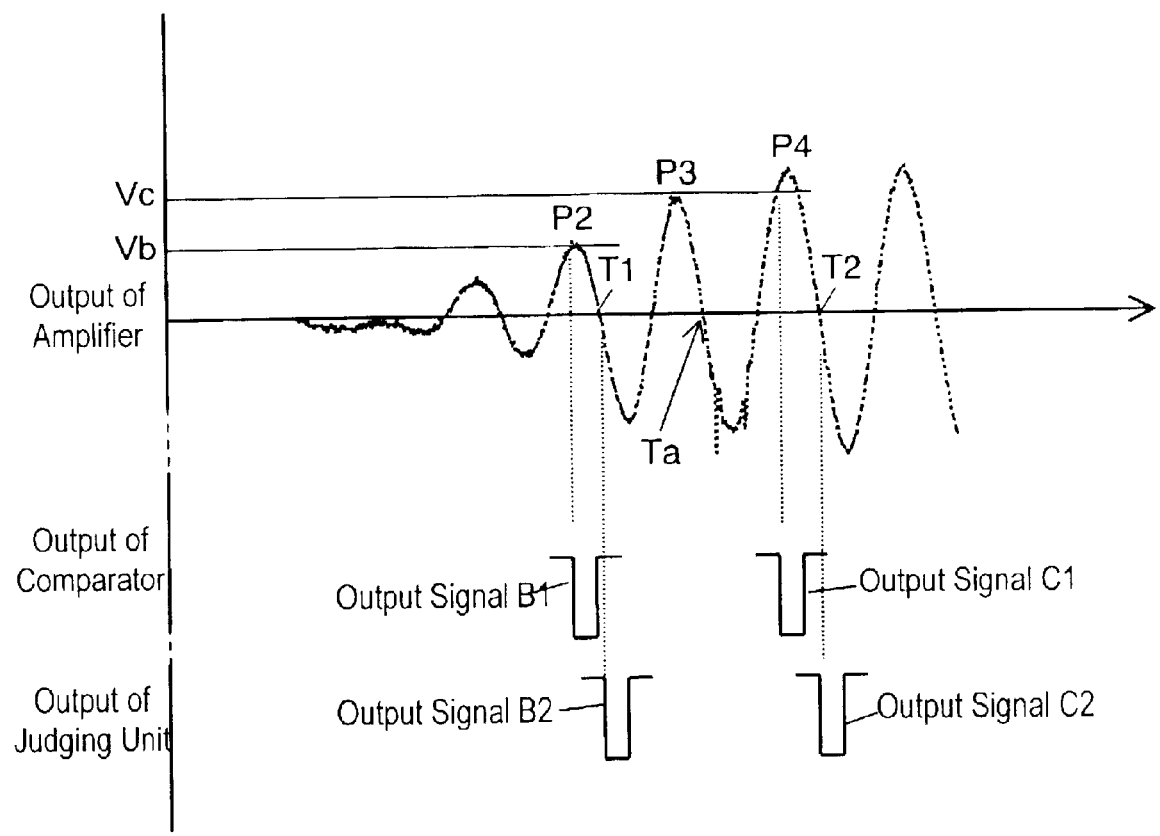
FIG. 2 is an explanatory view for illustrating an operation of the flow meter of embodiment 1.

FIG. 1 is a block diagram of a flow meter according to exemplary embodiment 1 of the present invention, and FIG. 2 illustrates an operation of the flow meter. A first ultrasonic wave oscillator 2 and a second ultrasonic wave oscillator 3 for transmitting and receiving ultrasonic wave are provided across a flow passage 1 where fluid flows at an angle $\phi$ to the direction of the flow of the fluid. A transmitter 5 drives the first and second ultrasonic wave oscillators 2, 3 to transmit an ultrasonic wave. A switching unit 4 switches the transmitting and receiving operation between the first ultrasonic wave oscillator 2 and the second ultrasonic wave oscillator 3. An amplifier 6 has its gain to output a signal received from the ultrasonic wave oscillator at a constant amplitude. A reference setting unit 13 determines a reference voltage according to a signal which is output from the amplifier 6. The reference voltage is then fed to a reference comparator 7 for comparing the voltage with the signal output from the amplifier 6. A judging unit 8 detects the arrival of the ultrasonic wave based on a signal output from the reference comparator 7 and the signal output from the amplifier 6. A repeating unit 9 counts a predetermined number of signals output from the judging unit 8 and supplies the signals output from the judging unit to a controller 12. A time counter 10 measures a duration of time while the repeating unit 9 counts the predetermined number of the signals output from the judging unit 8. A flow-rate calculator 11 calculates a flow rate of the fluid based on the duration measured by the time counter 10 in consideration with the cross section of the flow passage and conditions of the flow. The controller 12 controls the transmitter 5 and the amplifier 6 in responsive to signals output from the repeating unit 9 and the flow-rate calculator 11. A propagation-time measuring unit 13b measures a propagating duration of the ultrasonic wave based on a start signal from the controller 12 for starting transmitting the ultrasonic wave and the signal output from the judging unit 8. A voltage setting unit 13a determines the reference voltage based on a signal output from the propagation-time measuring unit 13b, and outputs the reference voltage to the reference comparator 7. The propagation-time measuring unit 13b and the voltage setting unit 13a constructs a reference setting unit 13.

An operation of the flow meter of embodiment 1 for determining the reference voltage level will be explained.

FIG. 2 illustrates the operation of the flow meter of embodiment 1. Upon starting the measuring of the flow rate, the controller 12 drives the transmitter 5 to transmit an ultrasonic wave from the first ultrasonic wave oscillator 2. The ultrasonic wave transmitted from the first ultrasonic wave oscillator 2 is propagated in the flow of the fluid and received by the second ultrasonic wave oscillator 3. The amplifier 6 amplifies a signal output according to the ultrasonic wave received by the second ultrasonic wave oscillator 3 by a gain so as to outputs a signal having a constant amplitude to the reference comparator 7 and the judging unit 8.

Upon receiving the start signal from the controller 12 and the signal from the judging unit 8, the propagation-time measuring unit 13b starts measuring the duration of the ultrasonic wave propagated through the flow passage.

Then while the propagation-time measuring unit 13b measures the duration, the voltage setting unit 13a decreases the reference voltage to a voltage Vb for permitting the judging unit 8 to detect the first zero-crossing point T1 after the second peak P2 of the amplified signal. This allows the reference comparator 7 and the judging unit 8 to output signals B1 and B2, respectively. Accordingly, the duration measured by the propagation time measuring unit 13b becomes shorter by one period of the ultrasonic wave, e.g. 2 μs for a ultrasonic wave of 500 kHz than the duration until the judging unit 8 detects the first zero-crossing point after the third peak P3 of the amplified signal.

If the duration measured by the propagation time measuring unit 13b becomes shorter by one period of the ultrasonic wave, the voltage setting unit 13a increases the reference voltage to a voltage Vc for permitting the first zero-crossing point T2 in time after the fourth peak P4 of the amplified signal to be detected. This allows the reference comparator 7 and the judging unit 8 to output signals C1 and C2, respectively. Accordingly, the duration of the propagation measured by the propagation-time measuring unit 13b becomes longer by one period of the ultrasonic wave than the duration until the judging unit 8 detects the first zero-crossing point in time after the third peak P3.

By this manner, the reference voltage varies from near the second peak P2 to near the third peak P3, as shown in FIG. 2. The reference voltage is then set to an intermediate level between the two peaks by the voltage setting unit 13a and is supplied to the reference comparator 7. The reference comparator 7 compares the signal output from the amplifier 6 with the reference voltage, and outputs, to the judging unit 8, a signal indicating the time point when that the signal from the amplifier 6 exceeds the reference voltage. The judging unit 8 judges the first zero-crossing point Ta, when the signal output from the amplifier 6 shifts from positive to negative after the time point as an arrival time of the ultrasonic wave, and outputs the signal indicating the point to the repeating unit 9.

As described, in the flow meter of embodiment 1, the range of the reference voltage is determined based on the propagation duration changing according to the reference voltage changed by the reference setting unit 13. The range of the reference voltage enables the judging unit 6 to detect a specified time in the signal output from the amplifier 6, for example, the first zero-crossing point after the third peak P3. The reference voltage is then set to an intermediate level in the range. As the result, the flow meter stably detects a specified time in the signal. The reference voltage of the flow meter is determined readily and accurately at periodic intervals or at every time of the measurement of the flow rate, thus being maintained in optimum.

(Exemplary Embodiment 2)

Figure 3:
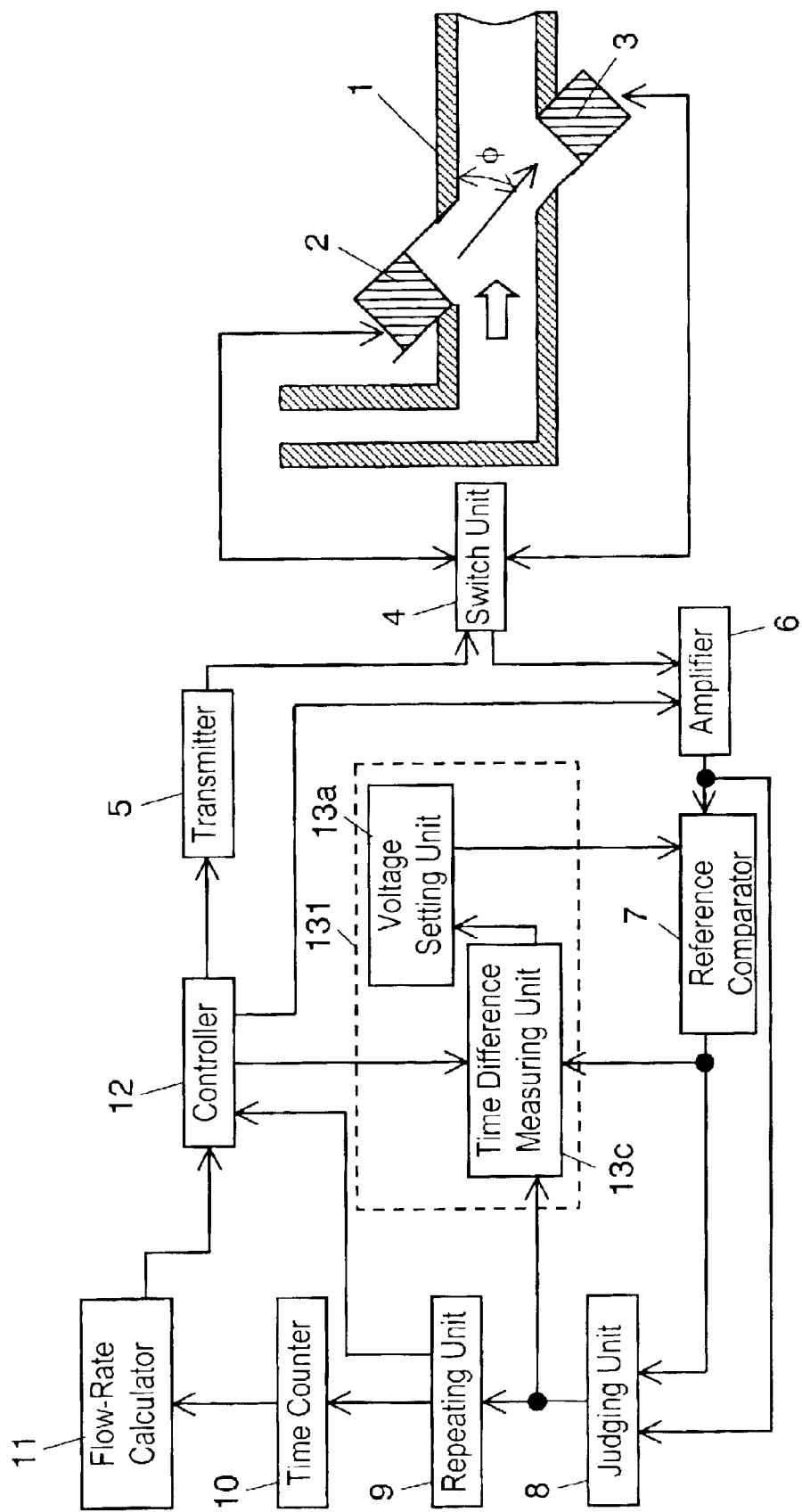
FIG. 3 is a block diagram of a flow meter according to exemplary embodiment 2 of the invention.
Figure 4:
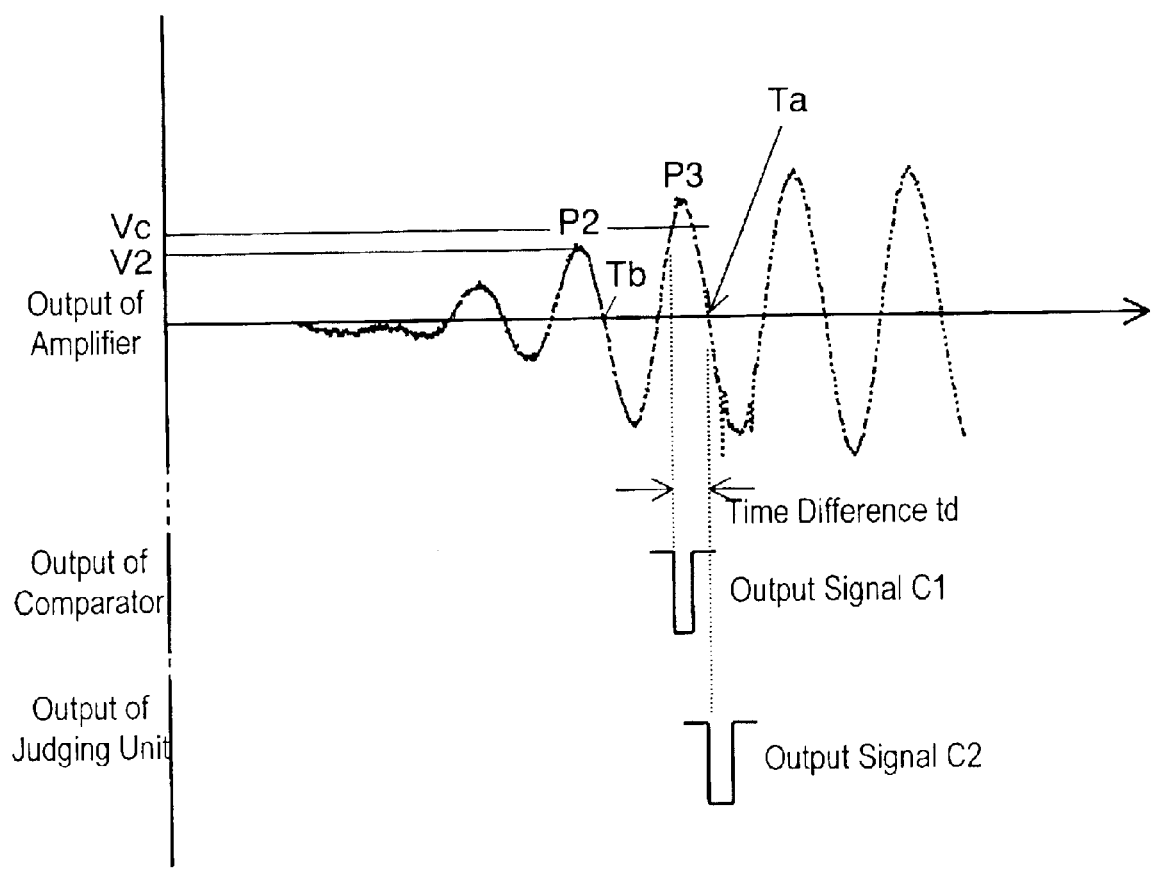
FIG. 4 is an explanatory view for illustrating an operation of the flow meter of embodiment 2.
Figure 5:
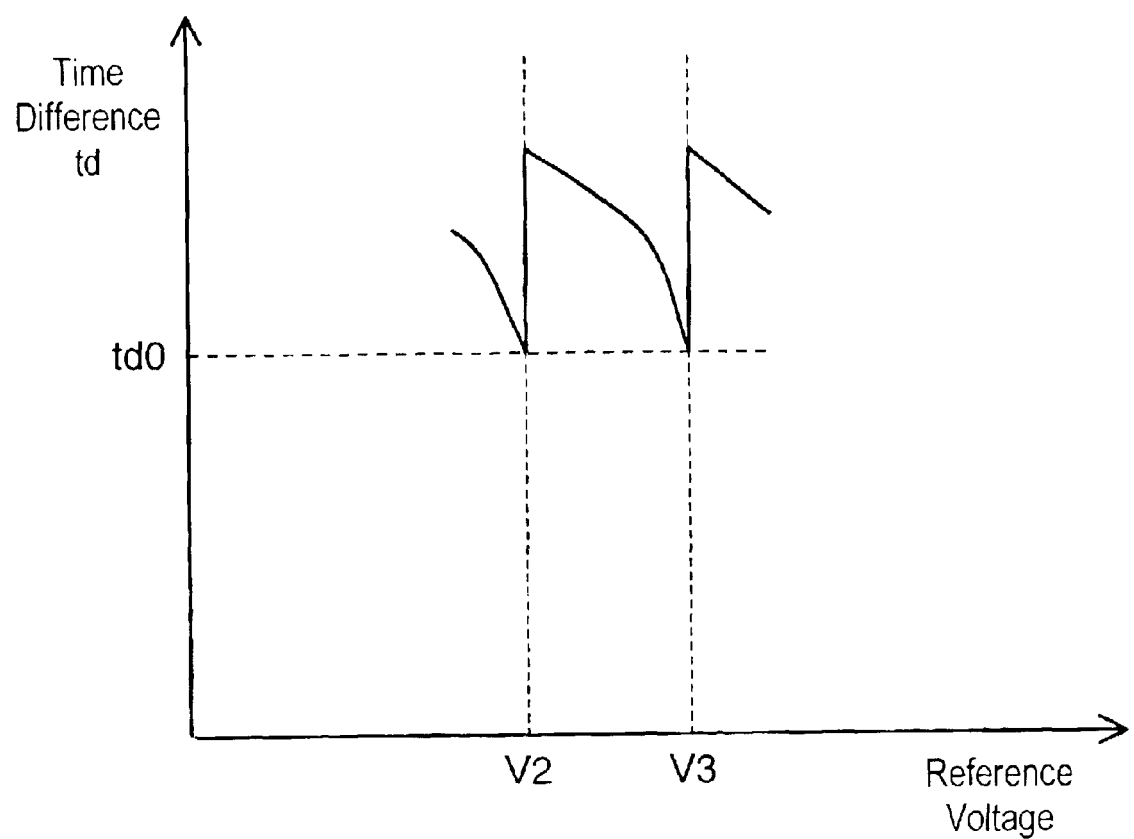
FIG. 5 is a characteristic diagram for showing an operation of the flow meter of embodiment 2.

FIG. 3 is a block diagram of a flow meter according to exemplary embodiment 2 of the present invention, and FIGS. 4 and 5 illustrate operations of the flow meter. A time difference measuring unit 13c measures a time difference between a signal output from a reference comparator 7 and a signal output from a judging unit 8. The time difference measuring unit 13c and a voltage setting unit 13a constructs a reference setting unit 131. The other elements are identical to those of embodiment 1 and are explained in no more detail.

An operation of the another flow meter will be explained. Upon starting of measurement of a flow rate, the controller 12 drives the transmitter 5 to transmit an ultrasonic wave from the first ultrasonic oscillator 2. The ultrasonic wave transmitted from the first ultrasonic wave oscillator 2 is propagated through the flow passage 1 and is received by the second ultrasonic wave oscillator 3. The received signal is amplified by the amplifier 6 at a gain controlled by the controller 12 such that the amplifier 6 outputs the amplified signal having a constant amplitude to the reference comparator 7. The reference comparator 7, comparing the amplifier 6 with a reference voltage Vc, outputs a signal C1 to the judging unit 8 and the time difference measuring unit 13c at the time point when the signal output from the amplifier 6 exceeds the reference voltage Vc.

The judging unit 8 judges the first zero-crossing point Ta in time after the time point as shown in FIG. 4, as an arrival time of the ultrasonic wave, and then outputs a signal C2 to the time difference measuring unit 13c. At the first zero-crossing point Ta, the signal output from the amplifier 6 has its sign change. The time difference measuring unit 13c measures a time difference td between the signal C1 output from the reference comparator 7 and the signal C2 output from the judging unit 8, as shown in FIG. 4. Based on the time difference td measured by the time difference measuring unit 13c, the voltage setting unit 13a increases and decreases the reference voltage Vc. Accordingly, the time difference td changes according to the reference voltage Vc, as shown in FIG. 5.

When the reference voltage Vc is a voltage V2 which is substantially equal to the second peak P2 for enabling the judging unit 8 to detect the first zero-crossing point Tb after the second peak P2 of the received signal, the time difference td0 is ¼ of the period of the received signal, i.e., 500 ns. Then, the reference voltage Vc is increased from the voltage V2 to a voltage for enabling the first zero-crossing point Ta after the third peak P3 of the signal to be detected, and the time difference td becomes local-maximum, as shown in FIG. 5. Then, as the reference voltage Vc is further increased, the time difference td decreases. The time difference td becomes the time difference td0 when the reference voltage is a voltage V3 substantially equal to the third peak P3 of the signal.

As described, the voltage setting unit 13a sets the reference voltage to a voltage making the time difference td be an intermediate between the maximum time difference and the minimum time difference (¼ of the period). This setting permits the time difference td measured by the time difference measuring unit 13c to be set to an intermediate between the maximum and minimum time differences according to the change of the reference voltage. Accordingly, the reference voltage is maintained so that a specified zero-crossing point Ta in the received signal is detected stably. Since the reference voltage in the flow meter is set readily and accurately at periodic intervals or at every time at the measurement of the flow rate, the reference voltage is maintained in optimum.

(Exemplary Embodiment 3)

Figure 6:
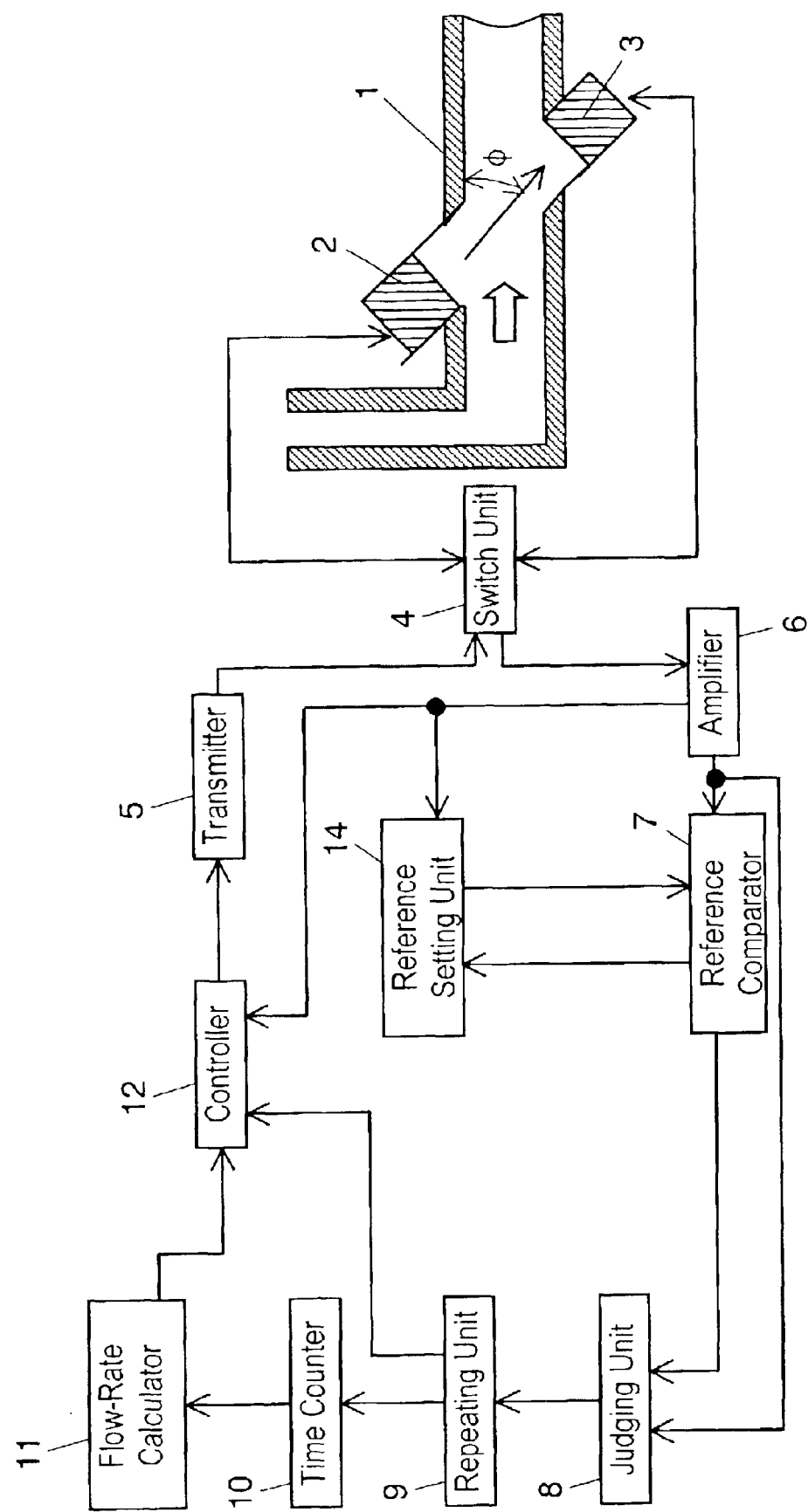
FIG. 6 is a block diagram of a flow meter according to exemplary embodiment 3 of the invention.
Figure 7:
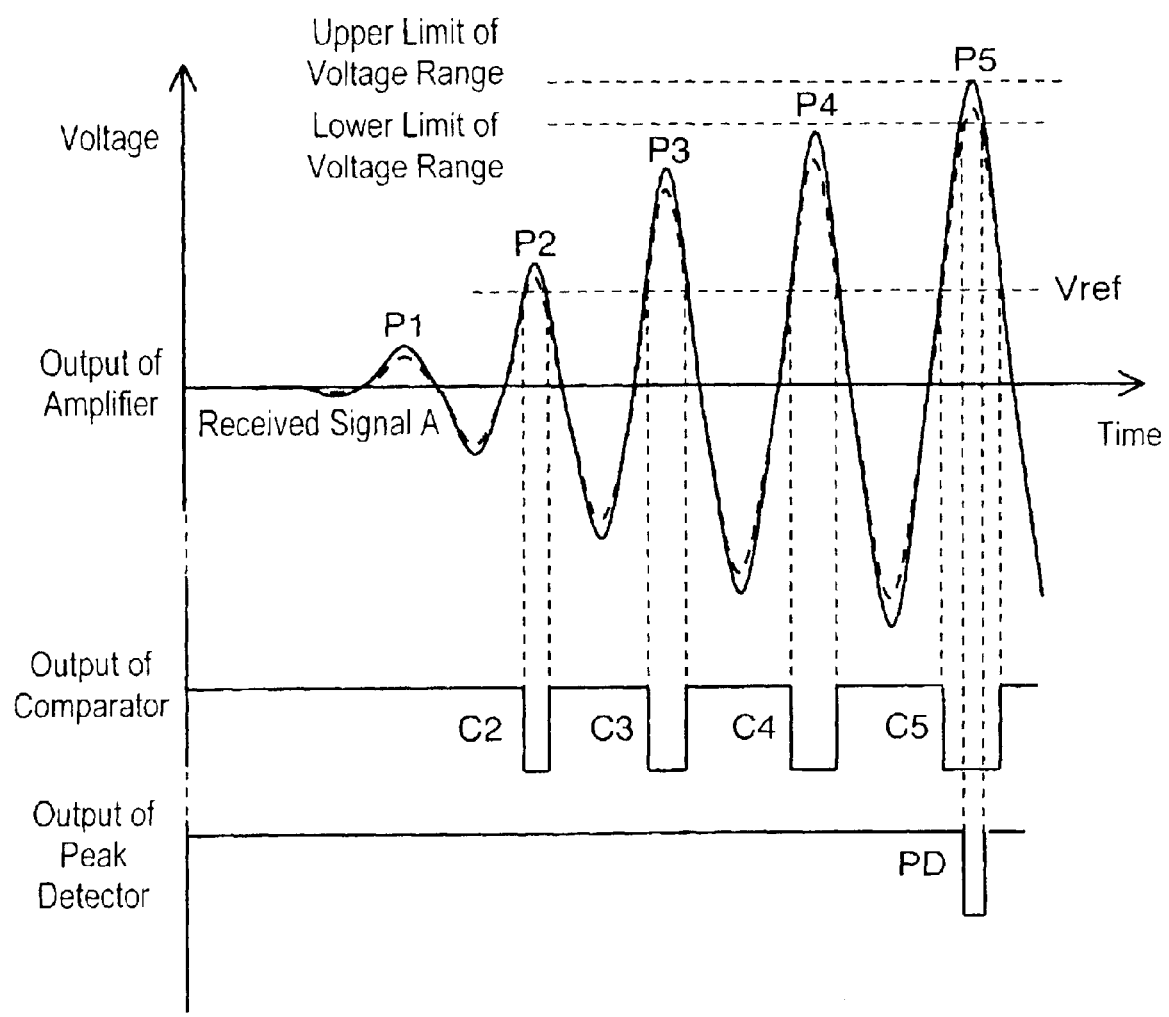
FIG. 7 is an explanatory view for illustrating an operation of the flow meter of embodiment 3.
Figure 8:
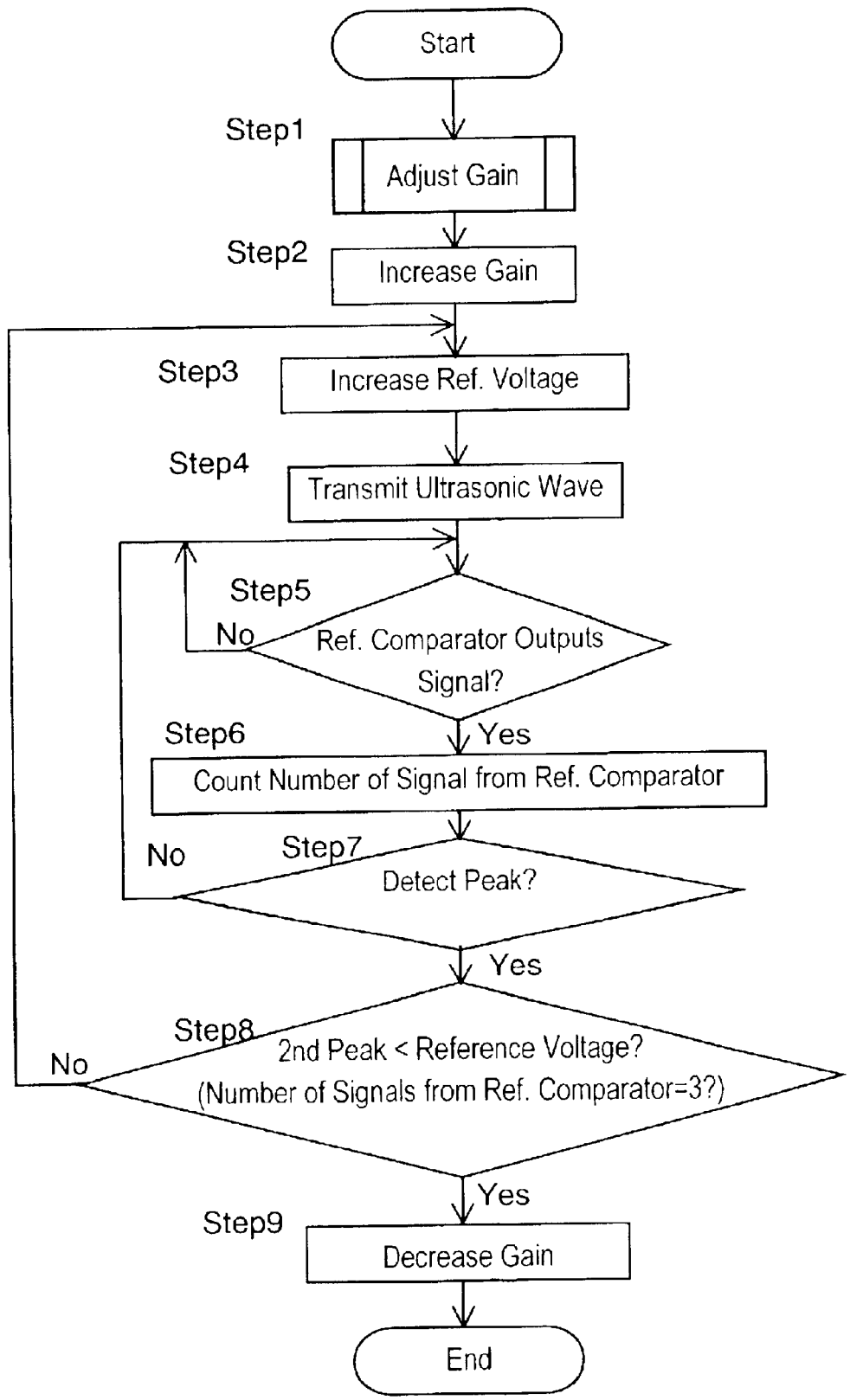
FIG. 8 is a flow chart of an operation of the flow meter of embodiment 3.

FIG. 6 is a block diagram of a flow meter according to exemplary embodiment 3 of the present invention. FIG. 7 illustrates an operation of the flow meter. FIG. 8 is a flowchart of the operation. A first ultrasonic wave oscillator 2 and a second ultrasonic wave oscillator 3 for transmitting and receiving ultrasonic waves are provided at an angle φ to a direction of the flow of fluid across a flow passage 1. A transmitter 5 drives the first and second ultrasonic wave oscillators 2 and 3 to transmit an ultrasonic wave. A switching unit 4 switches the transmitting and receiving of the waves between the first ultrasonic wave oscillator 2 and the second ultrasonic wave oscillator 3. An amplifier 6 amplifies a signal received from the ultrasonic wave oscillator at a receiving side with a gain controlled by a controller 12. A reference comparator 7 compares the signal amplified and output by the amplifier 6 with a reference voltage. A judging unit 8 determines an arrival time of the ultrasonic wave according to a signal output from the reference comparator 7 and the signal output from the amplifier 6. A repeating unit 9 counts a predetermined number of signals output from the judging unit 8 and outputs a signal to the controller 12. A time counter 10 measures a duration of time for the repeating unit 9 to count the predetermined number of signals output from the judging unit 8. A flow-rate calculator 11 calculates a flow rate of the fluid according to the duration measured by the time counter 10 in consideration with the cross section of the flow passage and conditions of the flow. The controller 12 controls the transmitter 6 and the amplifier 6 based on signals output from the repeating unit 9 and the flow-rate calculator 11. A reference setting unit 14 including a digital-to-analog (D/A) converter or an electronic variable resistor determines the reference voltage used in the reference comparator 7. The reference setting unit 14 determines the reference voltage based on a signal which the reference comparator 7 outputs while the reference voltage is changed.

An operation of the flow meter of embodiment 3 will be explained referring to FIG. 8. The controller 12, when being turned on, starts an initial setting procedure for determining the reference voltage by adjusting a gain of the amplifier 6. After the gain is adjusted, the received signal is amplified, e.g., so that the fifth peak P5 of the signal stays in a desired range as shown in FIG. 7. When the signal is exceeds the upper limit of the range, the amplifier 6 supplies a peak detection signal PD to the controller 12 and the reference setting unit 14. The gain of the amplifier 6 is modified to a first gain for maintaining the signal received by the ultrasonic wave oscillator at the receiving side in constant (Step 1). Then, the received signal is amplified with a second gain which is larger than the first gain of the amplifier 6 while a change of a peak, e.g. the second peak P2, just before a peak, the third peak P3, used for determining the arrival time of the received signal is considered (Step 2). The resultant amplified signal is shown in FIG. 7.

In FIG. 7, the signal amplified at the first gain is denoted by the dotted line, while the signal amplified at the second gain is denoted by the real line. The reference setting unit 14 increases the reference voltage Vref by one control unit (e.g., 5 mV) from the minimum level of the voltage for comparison with the signal A amplified at the second gain, as shown in FIG. 7 (Step 3). According to embodiment 3, the minimum level of the reference voltage Vref is larger than the first peak P1 but smaller than the second peak P2 of the signal A. The controller 12 sets the predetermined number used in the repeating unit 9 to one and drives the transmitter 5 to transmit an ultrasonic wave from the first ultrasonic wave oscillator 2 (Step 4). The ultrasonic wave transmitted from the first ultrasonic wave oscillator 2 is propagated through the flow passage 1 and received by the second ultrasonic wave oscillator 3. The signal output from oscillator 3 is amplified by the amplifier 6 and is then transferred to the reference comparator 7. The reference comparator 7 compares the signal output from the amplifier 6, i.e., the signal A, with the reference voltage Vref. If the signal A is larger than the voltage Vref, the comparator 7 outputs signals C2, C3, C4, and C5 to both the reference setting unit 14 and the judging unit 8, as shown in FIG. 7 (Step 5). The reference setting unit 14 counts the number of the signals C2 to C5 output from the reference comparator 7 (Step 6). Steps 5 and 6 are repeated until the amplifier 6 outputs the peak detection signal (Step 7). When receiving the peak detection signal from the amplifier 6, the reference setting unit 14 examines whether the number of the signals from the reference comparator 7 is three or not (Step 8). When the number is not three, the reference voltage Vref is increased by the one control unit (Step 3), and then, steps 4 to 8 are repeated. When the number of the signals output from the reference comparator 7 is three, the gain of the amplifier 6 is set back to the first gain (Step 9).

That is, if the reference voltage Vref is not larger than the second peak P2 of the received signal, the reference comparator 7 outputs the four signals C2 to C5 before the peak detection signal is received from the amplifier 6. Then, when the reference voltage Vref exceeds the second peak P2, the reference comparator 7 outputs three of the signals C3 to C5 and does not output the signal C2. The reference setting unit 14 stops increasing the reference voltage Vref just when the number of the signals outputs from the reference comparator 14 shifts from four to three. When the gain of the amplifier 6 is set back to the first gain, the reference voltage Vref of the reference setting unit 14 becomes slightly larger than the second peak P2 of the received signal. A difference between the reference voltage Vref and the second peak P2 is predetermined so that the second peak P2 varies during the measurement of the flow rate. This prevents the second peak P2 from exceeding the reference voltage Vref even if the received signal varies in its amplitude during the measurement of the flow rate. Therefore, the reference voltage Vref can have a large margin against the third peak P3, thus allowing the judging unit 8 to judge the arrival of the received signal of the ultrasonic wave regardless of any change in the amplitude of the received signal.

As described, according to this embodiment, the reference voltage to be determined by the reference setting unit 14 according to the signal output from the reference comparator 7. More specifically, the reference voltage is set to an optimum level in consideration of the maximum varying amplitude of the peak just before the peak to be detected for detecting the arrival of the received signal. Accordingly, the peak just before the peak to be detected for detecting the arrival of the received signal does not exceed the reference voltage, hence allowing the reference voltage to have the large margin against the peak of the wave used for detecting the arrival of the received signal. As the result, the flow meter of embodiment 3 can be improved in the detecting of the signal against its amplitude change, thus measuring the flow rate of the fluid accurately. According to embodiment 3, the amplifier 6 amplifies the received signal at the gain higher rate than the gain set before the reference voltage is determined. However, the reference voltage can thus be set to the voltage Vref which is larger than the peak (e.g. the second peak P2) of the received signal just before the peak (e.g. the third peak P3) to be detected for detecting the arrival of the received signal in consideration that the second peak P2 may vary during the measurement of the flow rate. Moreover, since the number of the signals output from the reference comparator 7 during the change of the reference voltage indicates the voltages of the peaks of the received signal, the controller 12 can detect the relationship between the received signal and the reference voltage according to the number of the output signals of the reference comparator 7. The controller 12 may set the reference voltage Vref to an arbitrary intermediate level between the third peak P3 used for detecting the arrival of the received signal and the second peak P2 just before the third peak P3.

(Exemplary Embodiment 4)

Figure 9:
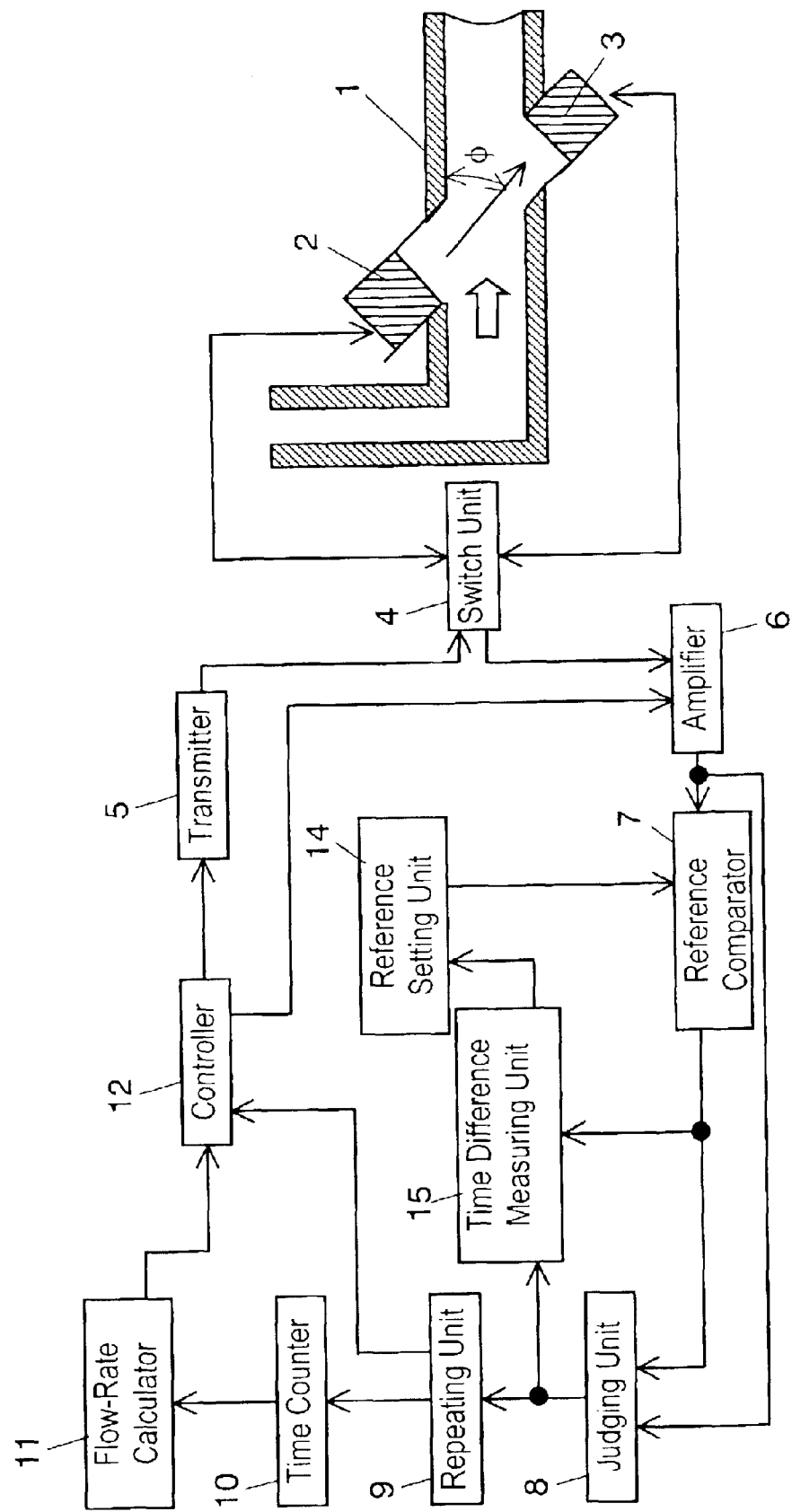
FIG. 9 is a block diagram of a flow meter according to exemplary embodiment 4 of the invention.
Figure 10:
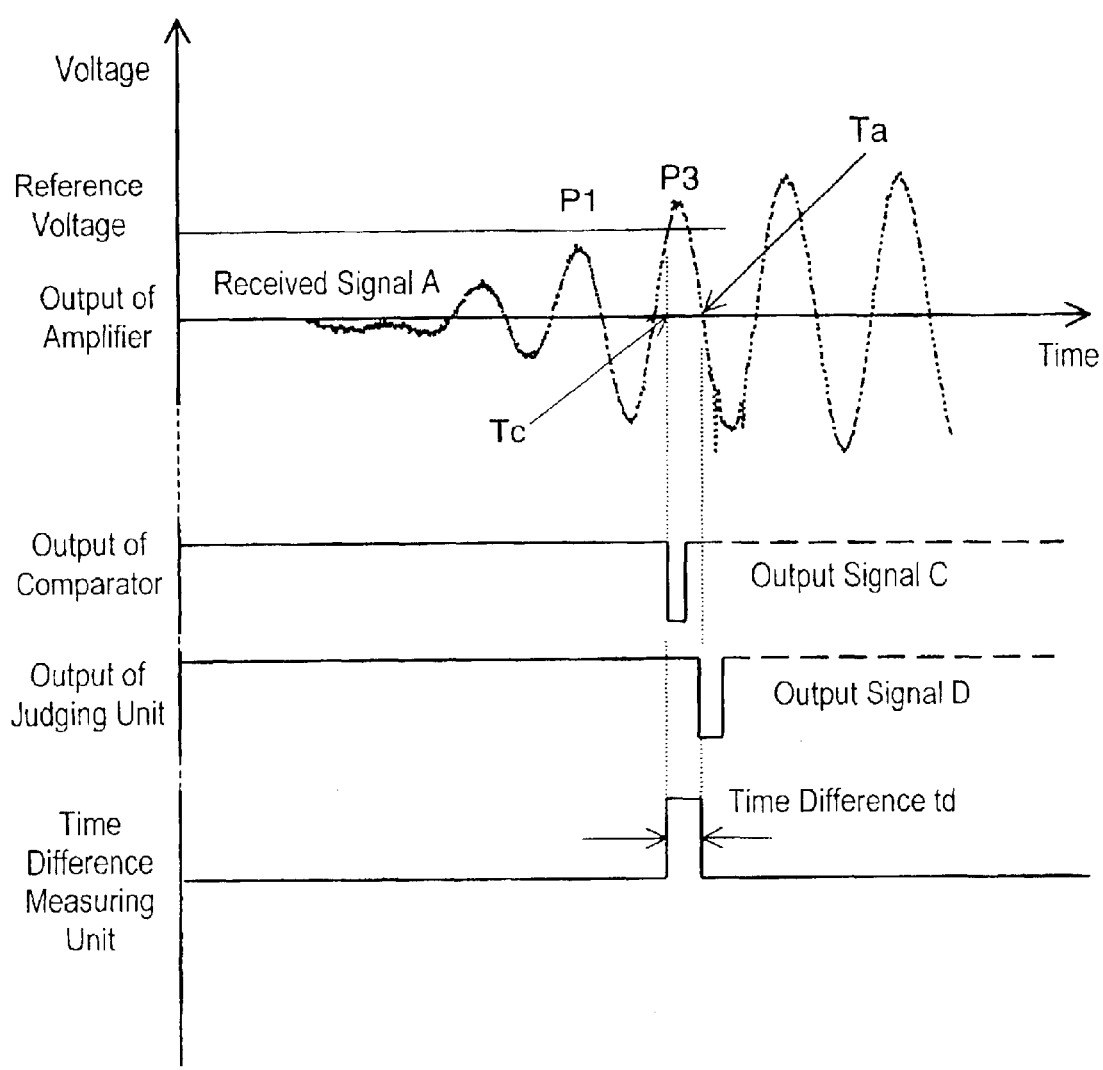
FIG. 10 is an explanatory view for illustrating an operation of the flow meter of embodiment 4.
Figure 11:
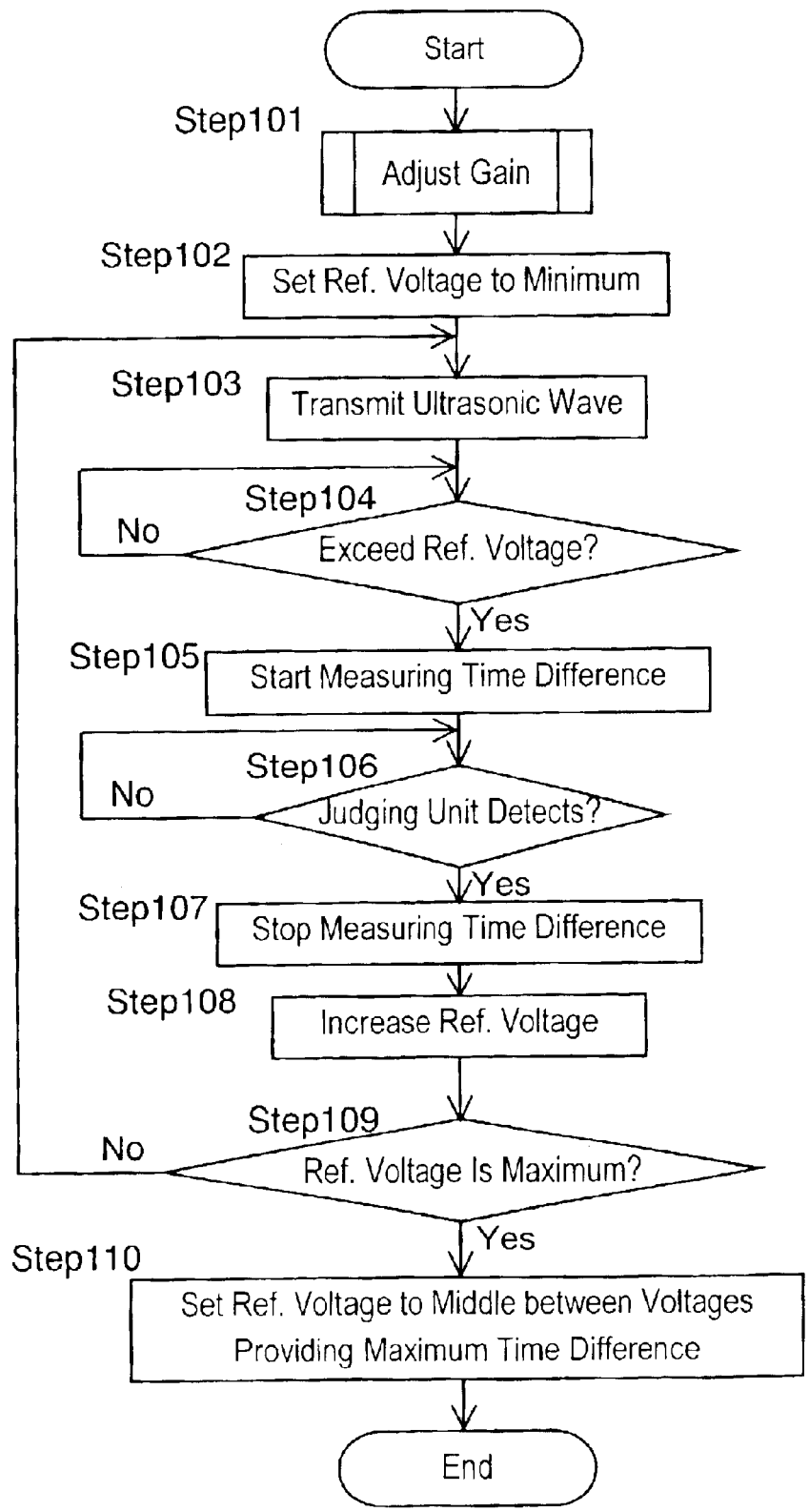
FIG. 11 is a flow chart of an operation of the flow meter of embodiment 4.
Figure 12:
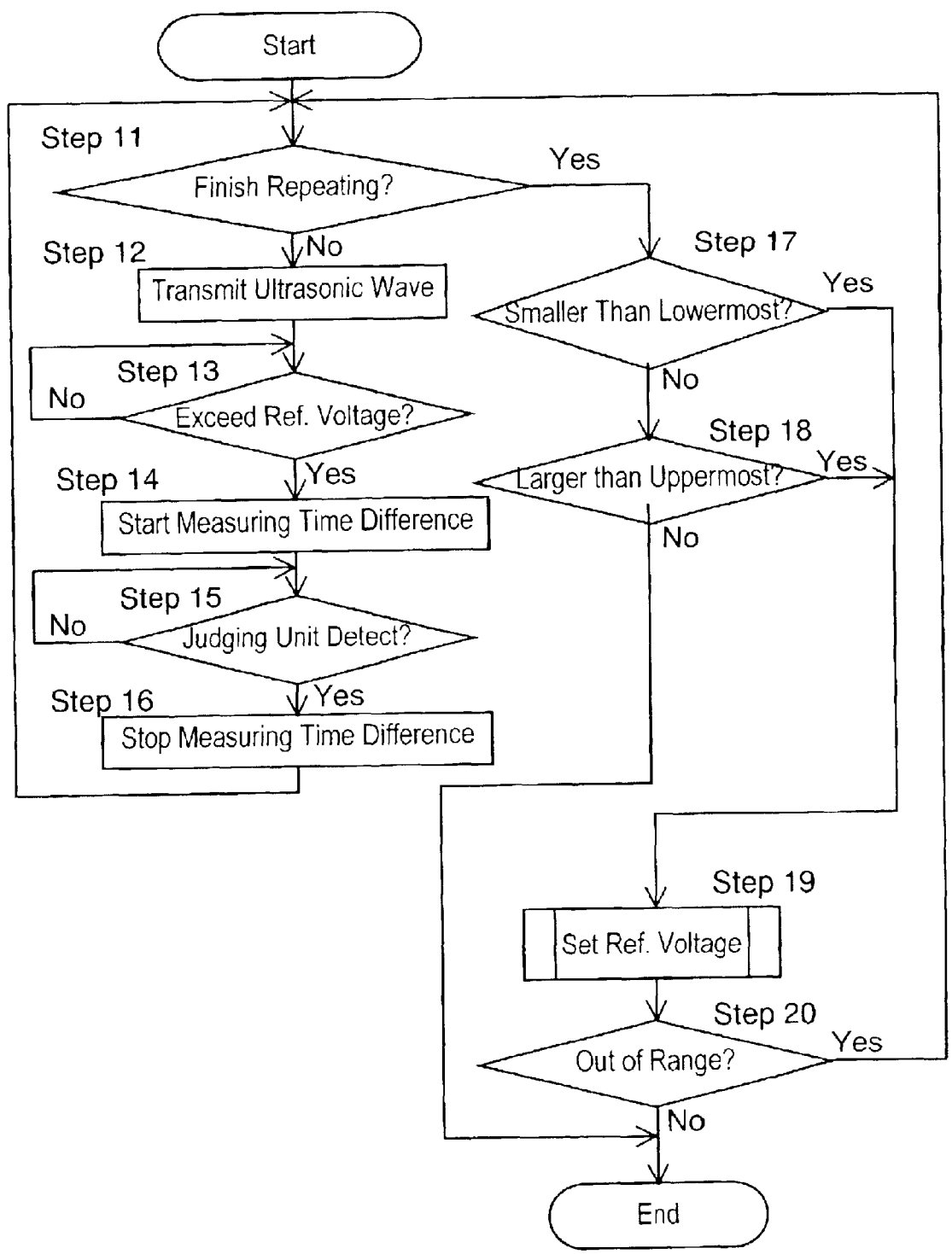
FIG. 12 is a flow chart of an operation of the flow meter of embodiment 4.

FIG. 9 is a block diagram of a flow meter according to exemplary embodiment 4 of the present invention. FIGS. 10 and 13 illustrate operations of the flow meter. FIGS. 11 and 12 are flowcharts of the operations.

In FIG. 9, a time difference measuring unit 15 measures a time difference between a signal output from the reference comparator 7 and a signal output from the judging unit 8. Differently from embodiment 3, a reference setting unit 14 determines a reference voltage in a reference comparator 7 according to the signal output from the time difference measuring unit 15. The other components are identical to those of embodiment 3 shown in FIG. 6 and are explained in no more detail.

An operation of the flow meter having above arrangement will be described referring to FIG. 11. The controller 12, when being turned on, changes a gain of an amplifier 6 and sets the reference voltage. According to embodiment 4, the gain of the amplifier 6 is adjusted similarly to embodiment 3, and an operation of the adjusting of the gain is explained in no more detail.

First, the controller 12 changes the gain such that a signal received by the ultrasonic wave oscillator at a receiving side is amplified and output at a desired amplitude (Step 101). Then, the reference setting unit 14 sets the reference voltage to a minimum level of a adjustable range of the voltage (Step 102). The controller 12 sets the number of signals used in the repeating unit 9 to one and drives the transmitter 5 to transmit an ultrasonic wave from the first ultrasonic wave oscillator 2 (Step 103).

The ultrasonic wave output from the first ultrasonic wave oscillator 2 is propagated through the flow passage 1 and received by the second ultrasonic wave oscillator 3. A signal output from the oscillator 3 is amplified by the amplifier 6 and then is transferred to the reference comparator 7.

FIG. 10 shows the resultant amplified signal. The reference comparator 7 compares the signal output from the amplifier 6 (a signal A) with the reference voltage. At a time point Tc when the signal A is larger than the reference voltage, the comparator 7 outputs a signal C to both the time difference measuring unit 15 and the judging unit 8 (Step 104). Upon receiving the signal C, the time difference measuring unit 15 starts measuring a time (Step 105). The judging unit 8 judges that the first zero-crossing point Ta in time after the time point Tc of the signal A is detected as an arrival time of the ultrasonic wave, thus outputting a signal D to both the repeating unit 9 and the time difference measuring unit 15 (Step 106). When receiving the signal D, the time difference measuring unit 15 stops measuring the time and outputs a measured time difference Td to the reference setting unit 14 (Step 107). The reference setting unit 14 increases the reference voltage by one control unit (e.g., 2 mV) in the range (Step 108). Since the number determined for the repeating unit 9 is one, the controller 12 receives, from the repeating unit 9, a signal indicating that one repeating operation has been completed, and again drives the transmitter 5 to transmit an ultrasonic wave from the first ultrasonic wave oscillator 2. The procedure from Step 103 to Step 108 is repeated until the reference setting unit 14 sets the reference voltage to the maximum level in the range.

While the reference setting unit 14 sets the reference voltage between the minimum and the maximum, the time difference measuring unit 15 measures plural inflection points at which time differences vary significantly from just before the points. For example, the reference setting unit 14 may determine the reference voltage at the middle between two inflection points distanced most of plural inflection points between which the time difference changes largely, for example, between which the time difference exceeds 1.3 times greater than an initial of the time difference.

Figure 13A:
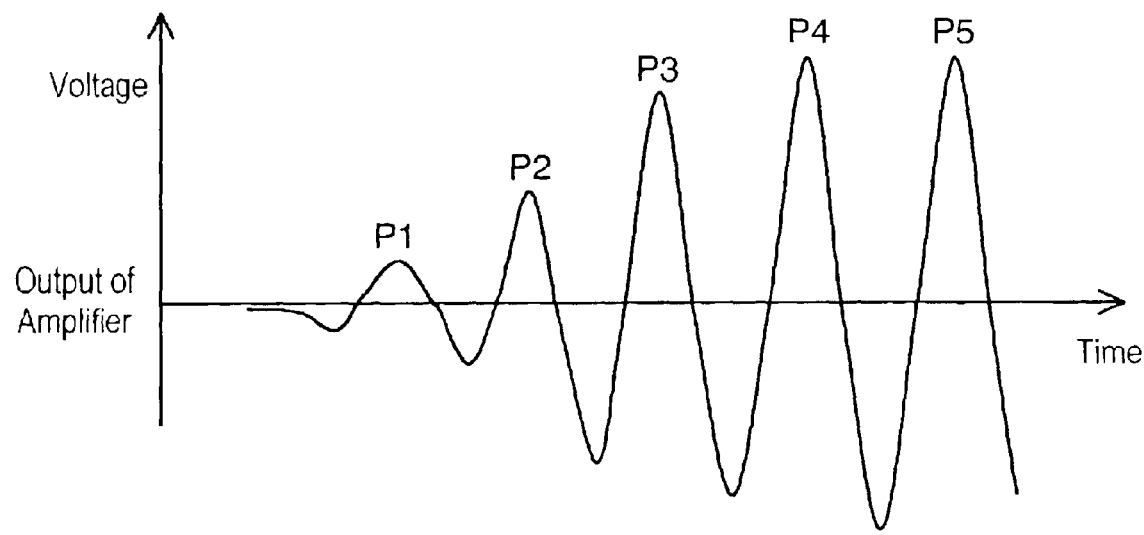
FIGS. 13A and 13B are explanatory diagrams for illustrating an operation of the flow meter of embodiment 4.
Figure 13B:
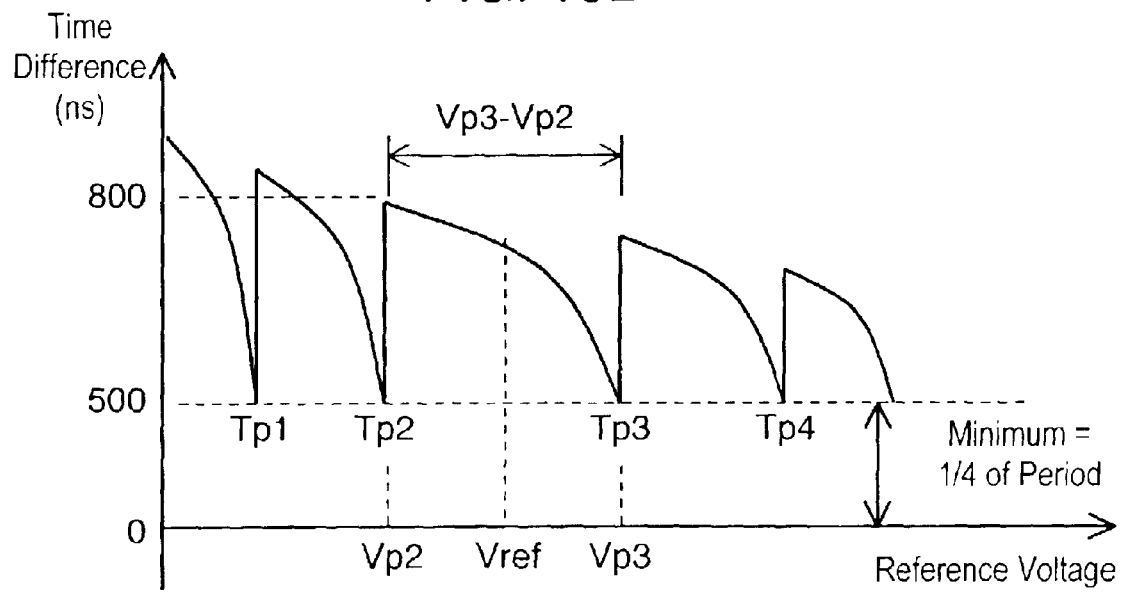

An operation at step 110 will be explained in more detail referring to FIGS. 13A and 13B. FIG. 13B illustrates a profile of the time difference measured by the time difference measuring unit 15 when the reference voltage of the reference setting unit 14 varies from the minimum to the maximum. The time difference is an interval between the signal output from the reference comparator 7 and the signal output from the judging unit 8, as shown in FIG. 10. The time difference measuring unit 15 measures time differences Tp1, Tp2, Tp3, Tp4, . . . corresponding to the first peak P1, the second peak P2, the third peak P3, the fourth peak P4, . . . of the received signal, respectively, with the reference voltage set to near the peaks. Each of the time differences Tp1, Tp2, Tp3, and Tp4 is substantially equal to ¼ of the period of the ultrasonic wave (e.g., 500 ns at the ultrasonic wave of 500 kHz). As the reference voltage exceeds each peak, the time difference measured by the time difference measuring unit 15 abruptly increases, thus being exhibited as inflection points Tp1, Tp2, Tp3, and Tp4, as shown in FIG. 13. For example, when the reference voltage having been smaller than the second peak P2 exceeds the second peak P2, the inflection point Tp2 is measured. This means that the reference voltage at the inflection point of the time difference is close to the peak. Accordingly, the difference of the reference voltage between any two adjacent inflection points represents a difference of the voltage between the two adjacent peaks.

As shown in FIG. 13, the difference between the points Tp1 and Tp2 represents a difference of the voltage between the first peak P1 and the second peak P2 and the difference of the voltage between the points Tp2 and Tp3 represents a difference of the voltage between the second peak P2 and the third peak P3. More specifically, the reference voltage is changed from the minimum to the maximum, the inflection points in the time difference accordingly appear. The reference voltage is determined between the second peak P2 and the third peak P3, as shown in FIG. 13, thus being determined at the largest voltage difference of the received signal. Thus, the reference voltage Vref is determined at an intermediate level between the second peak P2 and the third peak P3, as shown in FIG. 13. This allows the reference voltage to have a large margin against the voltages at the peaks P2 and P3. Accordingly, the judging unit 8 detects the arrival of the ultrasonic wave stability regardless of any change in the amplitude of the received signal.

The reference voltage of the reference setting unit 14 has been set in the above manner, and the controller 12 sets the repeating unit 9 to have a desired number of repeating times (e.g., 256) and starts the measurement of the flow rate.

An operation of the reference setting unit 14 after starting the measurement of the flow rate will be described referring to FIG. 12. First, the controller 12 drives the transmitter 5 to transmit an ultrasonic wave from the first ultrasonic wave oscillator 2 (Step 12). The ultrasonic wave (signal) is received by the second ultrasonic wave oscillator 3, is amplified by the amplifier 6, and is transferred to both the reference comparator 7 and the judging unit 8. The reference comparator 7 compares the received signal with the reference voltage (Step 13). When the received signal exceeds the reference voltage, the time difference measuring unit 13 starts measuring a time difference (Step 14) and continues the measuring until the judging unit 8 detects the first zero-crossing point in time after the start (Steps 15 and 16).

When the judging unit 8 detects the first zero-crossing point (i.e. the arrival of the ultrasonic wave), the controller 12 drives the transmitter 5 to repeat transmitting an ultrasonic wave from the first ultrasonic wave oscillator 2. The procedure from Step 12 to Step 16 is repeated by the predetermined number of times (Step 11). A range of the time difference is determined between the inflection points Tp2 and Tp3 (from 500 ns to 800 ns) at the initial setting of the reference voltage, as shown in FIG. 13. More particularly, the time difference may range from 20% to 80% of the range, i.e., from 560 ns (=(800 ns−500 ns)×0.2+500) to 740 ns (=(800 ns−500 ns)×0.8+500). After the procedure has been repeated the predetermined number of times, the reference setting unit 14 examines whether or not the time difference measured by the time difference measuring unit 15 is out of the range during the procedure being repeated and determines whether the reference voltage is set again or not according to a distribution of the measured time difference. In other words, the reference setting unit 14 examines whether or not the measured time differences is smaller than the lowermost (560 ns) of the range (Step 17). When the differences are smaller than the lowermost, the reference voltage is set again in the same manner as of the initial setting (Step 19). When the differences are not small, the reference setting unit 14 examines whether or not the measured time differences are larger than the uppermost (740 ns) of the range (Step 18). When the differences are larger, the reference voltage is set again by the same manner as of the initial setting (Step 19). When the measured time differences are smaller than the range or larger than the range, the initial setting of the controller 12 is repeated. If the measured time differences are within the range, the measurement of the flow rate is finished, and the time measuring unit 10 measures the duration from the start to the end of the repeating measured. Then, the transmitting of an ultrasonic wave is switched by the switching unit 4 from the first ultrasonic wave oscillator 2 to the second ultrasonic wave oscillator 3, and the flow rate is the measured by the above described steps. The duration of propagating the ultrasonic waves is measured from the upstream to the downstream and from the downstream to the upstream. Finally, the flow-rate calculator 11 calculates the flow rate of the fluid from a difference between the measured durations in consideration with the cross section of the flow passage and conditions of the flow.

Figure 14:
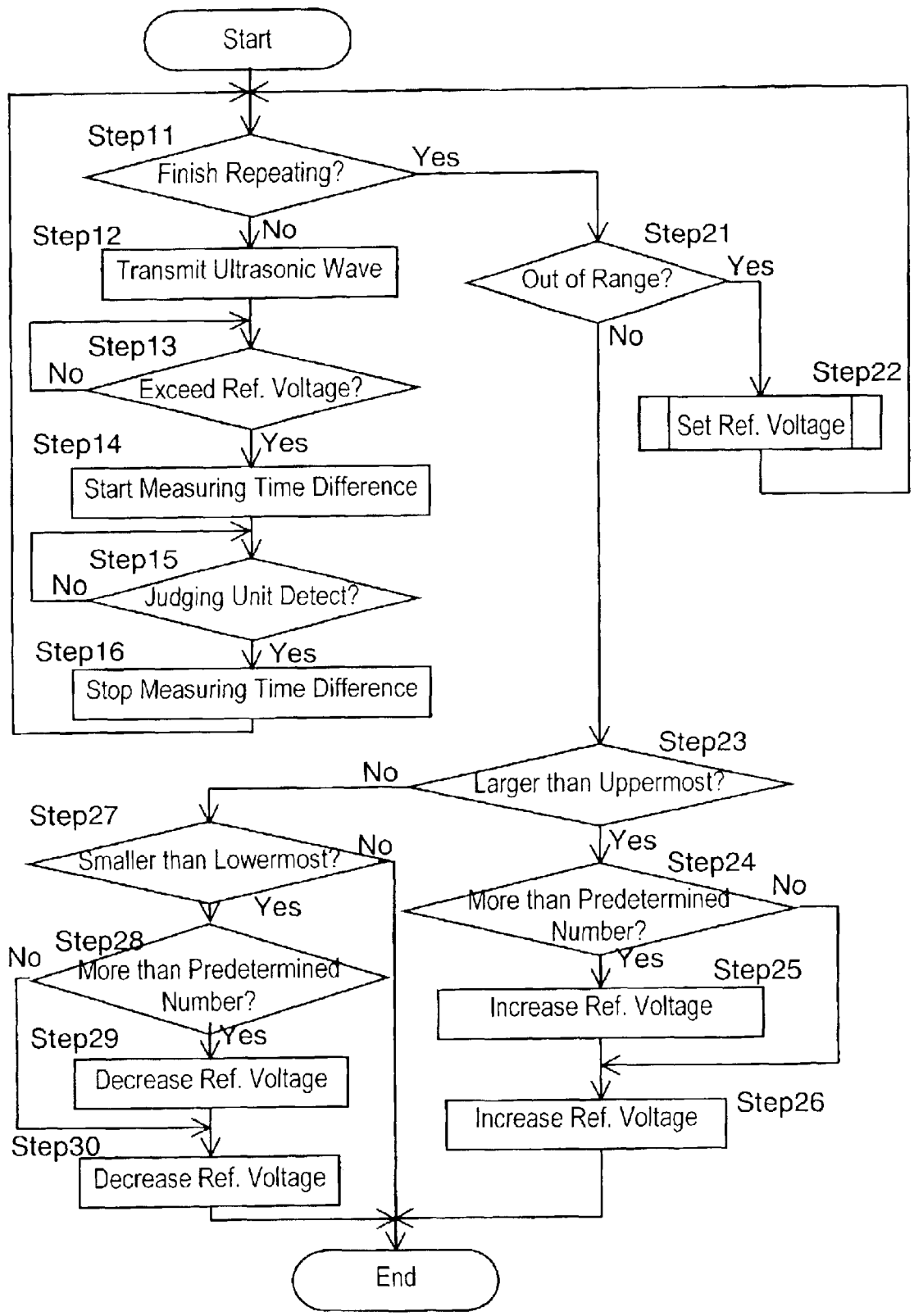
FIG. 14 is a flow chart of an operation of another flow meter of embodiment 4.

Another operation of the reference setting unit 14 will be described. FIG. 14 is a flowchart showing the operation of the reference setting unit 14. The procedure from Step 11 to Step 16 is identical to that from Step 11 to Step 16 shown in FIG. 12.

After the transmission of an ultrasonic wave has been repeated a desired number of times predetermined by the repeating unit 9, the reference setting unit 14 examines whether or not a time difference measured by the time difference measuring unit 15 during the repeating is out of the range, that is, larger than the uppermost or smaller than the lowermost of a range which is defined by multiplying the difference between the two adjacent inflection points at the initial setting of the reference voltage (Step 21) by a certain rate (e.g. 20%). When the time difference is out of the range, the reference setting unit 14 sets the reference voltage again by the same manner as of the initial setting (Step 22).

If no time difference is out of the range, the reference setting unit 14 further examines whether or not the measured time difference is larger than the uppermost (740 ns) of the range (Step 23). When the time difference is larger, the reference setting unit examines whether the number of times the larger time differences are measured is greater than a predetermined number (e.g., ten) (Step 24). If the number of times is greater, the reference setting unit 14 increases the reference voltage by one control unit (2 mV) per repeated time, i.e., two control units (Steps 25 and 26). If the number of times is not greater than the specific number, the reference setting unit 14 increases the reference voltage by one control unit (2 mV) (Step 26).

The reference setting unit 14 then examines whether or not the measured time difference is smaller than the lowermost (560 ns) of the range (Step 27). If the difference is smaller, the reference setting unit examines whether the number of times the measured time difference smaller than the lowermost is greater than a predetermined number (e.g., ten) (Step 28). If the number of times is greater, the reference setting unit 14 decreases the reference voltage by one control unit (2 mV) per repeated time, i.e., two control units (Steps 29 and 30). If the number of times is not greater than the predetermined number, the reference setting unit 14 decreases the reference voltage by one control unit (2 mV) (Step 30). According to a result of comparison with the uppermost of the range (Step 23) and the lowermost of the range (Step 27), the measured time differences are all in the range, the operation terminates without modifying the reference voltage.

As described, the reference voltage once set can be modified depending on the number of times that the time difference measured by the time difference measuring unit 15 during the measurement of the flow rate is out of the predetermined range of the time difference.

According to Embodiment 4, the reference voltage is first set at the middle between two adjacent inflection points having the largest distance of the inflection points, in which the time difference measured by the time difference measuring unit 15 significantly varies. The reference voltage may be set not to the middle between the time differences but to a lower level if the received signal has its amplitude biased to a specific (increasing or decreasing) aspect. For example, when the amplitude of the received signal tends to decreasingly varied, the reference voltage has a large margin against a change (the decreasing) of the amplitude of the received signal. More particularly, the reference voltage may be set to ⅓ of the range between two maximum distanced inflection points. The reference voltage can be set to a desired level corresponding to a property of a change of the amplitude of the received signal.

As described above, the reference voltage is initially set to a level such that the arrival of the ultrasonic wave is detected most steadily regardless of any change in the amplitude of the received signal indicating the receiving of the ultrasonic wave. Then, when the time difference measured by the time difference measuring unit 15 during the measurement of the flow rate becomes out of the range of the time difference which has been determined at the initial setting of the reference voltage, the reference voltage can be modified to an optimum level. As the reference voltage is automatically modified to a desired level, the voltage can remain optimum throughout the measurement of the flow rate by the flow meter.

(Embodiment 5)

Figure 15:
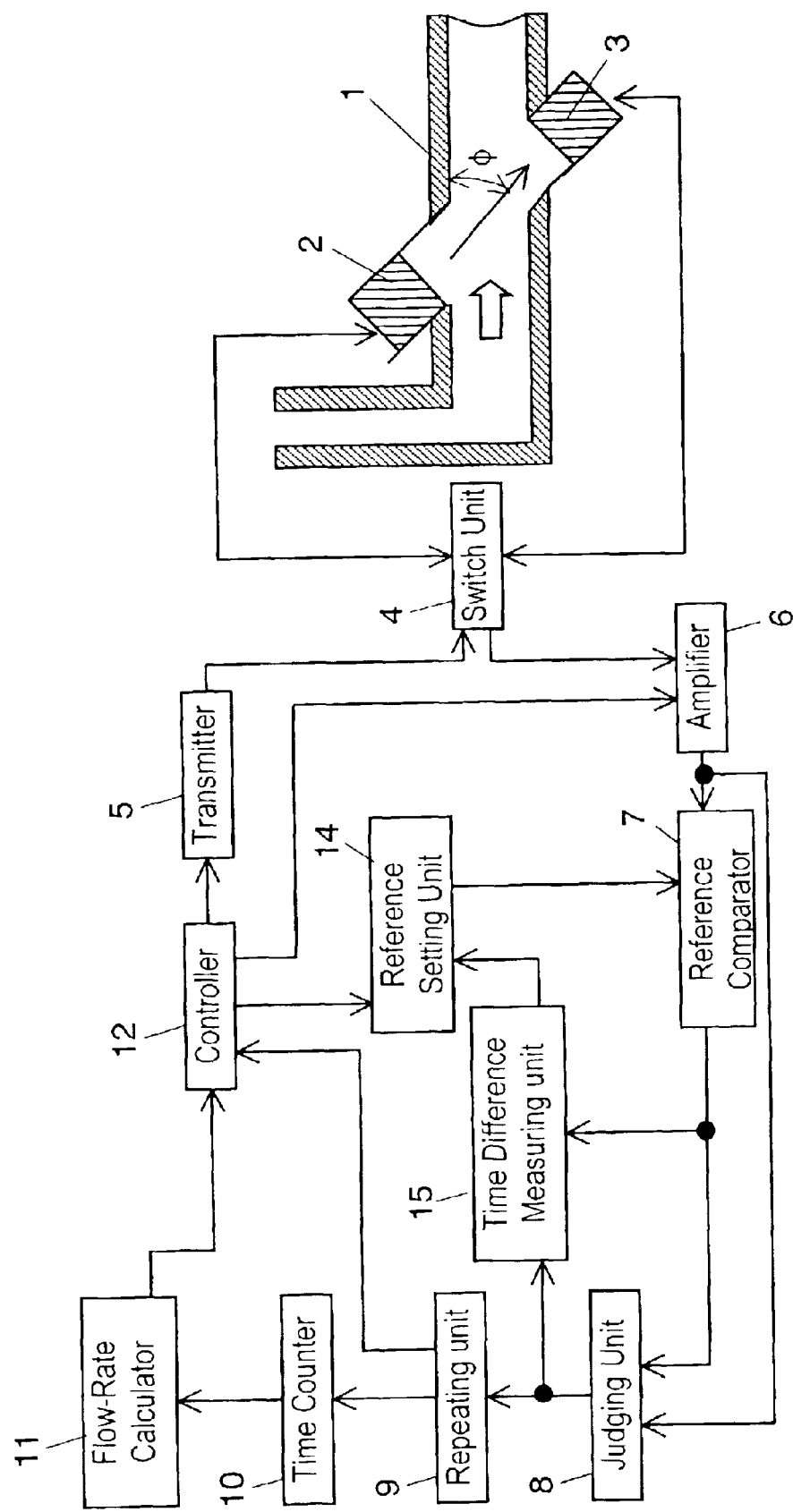
FIG. 15 is a block diagram of a flow meter according to exemplary embodiment 5 of the invention.
Figure 16:
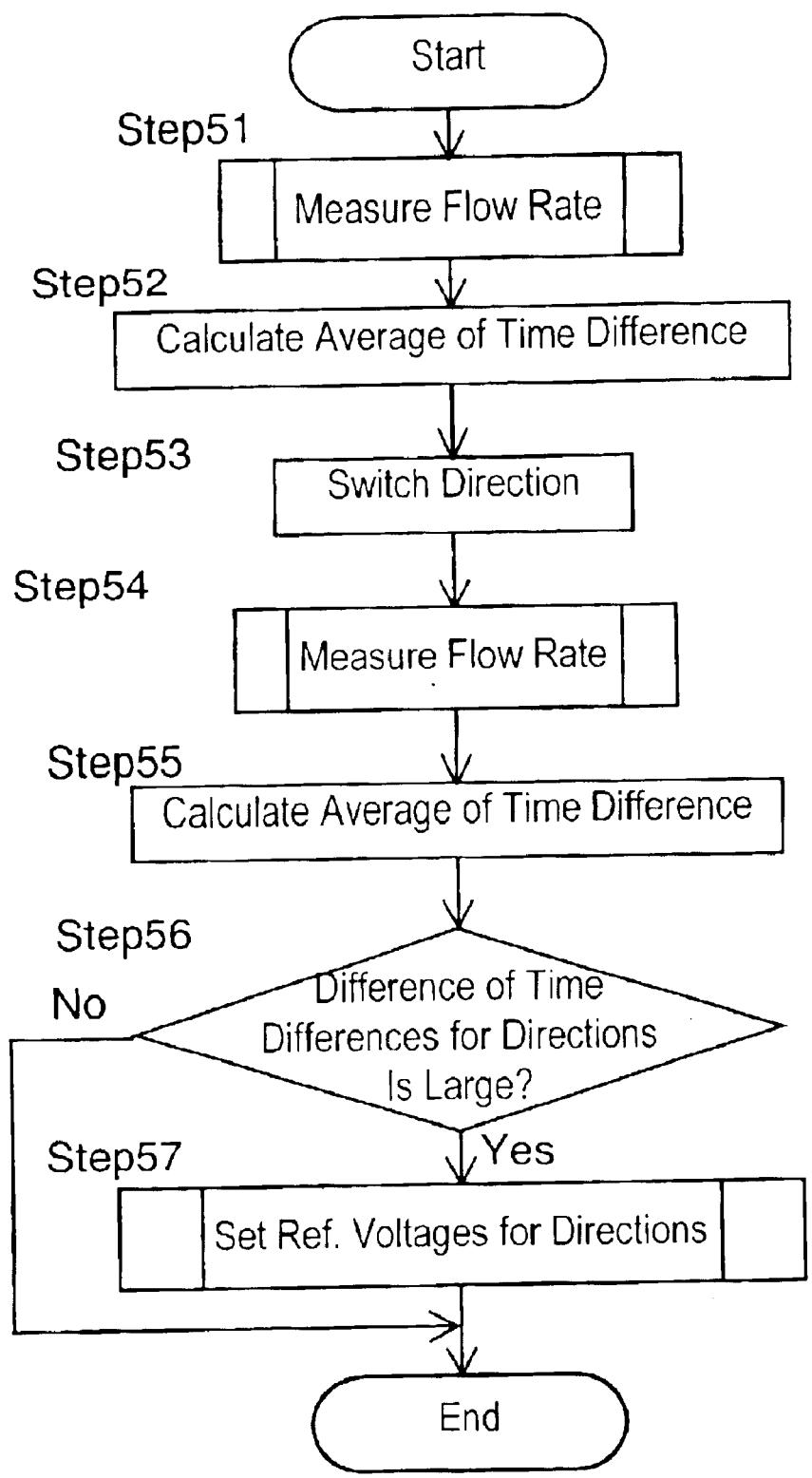
FIG. 16 is a flow chart of an operation of the flow meter of embodiment 5.

FIG. 15 is a block diagram of a flow meter according to exemplary embodiment 5 of the present invention. FIG. 16 is a flowchart of showing an operation of the flow meter. A reference setting unit 14 determines a reference voltage according to a signal output from the controller 12 which indicates the direction of an ultrasonic wave transmitted from a first ultrasonic wave oscillator or a second ultrasonic wave oscillator. The other components are identical to those of embodiment 4 and will be explained in no more detail.

An operation of the reference setting unit 14 in the flow meter different from that of embodiment 4 will now be described. The controller 12, when being turned on, performs an initial setting for determining a gain of an amplifier 6 and the reference voltage. The reference voltage is set, by the same manner as of Embodiment 4, to the middle between two inflection points of time difference being distanced most while inflection points are exhibited while the time differences measured by a time difference measuring unit 15 significantly varies during a change of the reference voltage from the minimum to the maximum. The controller 12 operates in the same manner as of embodiment 2 for repeating transmitting an ultrasonic wave a desired number of times predetermined for the repeating unit 9 to measure a flow rate of fluid in one direction (Step 51). After the measurement, the controller 12 calculates an average of the time differences measured by the time difference measuring unit 15 (Step 52). The controller 12 then drives the switching unit 4 to switch the transmission of an ultrasonic wave between the first ultrasonic wave oscillator 2 and the second ultrasonic wave oscillator 3 (Step 53), repeats the measurement of the flow rate in a reverse direction (Step 54), and calculates again an average of the time differences measured by the time difference measuring unit 15 (Step 55). The reference setting unit 14 compares the two averages of the time differences for the ultrasonic wave transmission of both the first ultrasonic wave oscillator 2 and the second ultrasonic wave oscillator 3 (Step 56). When a difference between the two averages of the time differences is greater than a predetermined level, for example, one average is 600 ns, and the other is 670 ns creating a 10% difference, the reference setting unit 14 determines the reference voltage for each of the directions of the ultrasonic wave transmission (Step 57), hence allowing the flow rate to be measured based on respective reference voltages.

According to embodiment 5, the detection signal indicating the reception of an ultrasonic wave is different in the perception sensitivity between two opposite directional flows of the fluid from the upstream to the downstream and from the downstream to the upstream, thus changing the relationship between the amplitude of the received signal and the reference voltage. The reference voltage can be set to an optimum level for each directions so that the time difference measured by the time difference measuring unit varies depending on the direction of transmission of the ultrasonic wave along the flow. The flow meter of embodiment 5 allows the reference voltage to be at its optimum level even when the received signal is different in the amplitude between the two opposite directions of transmission of the ultrasonic wave.

(Embodiment 6)

Figure 17:
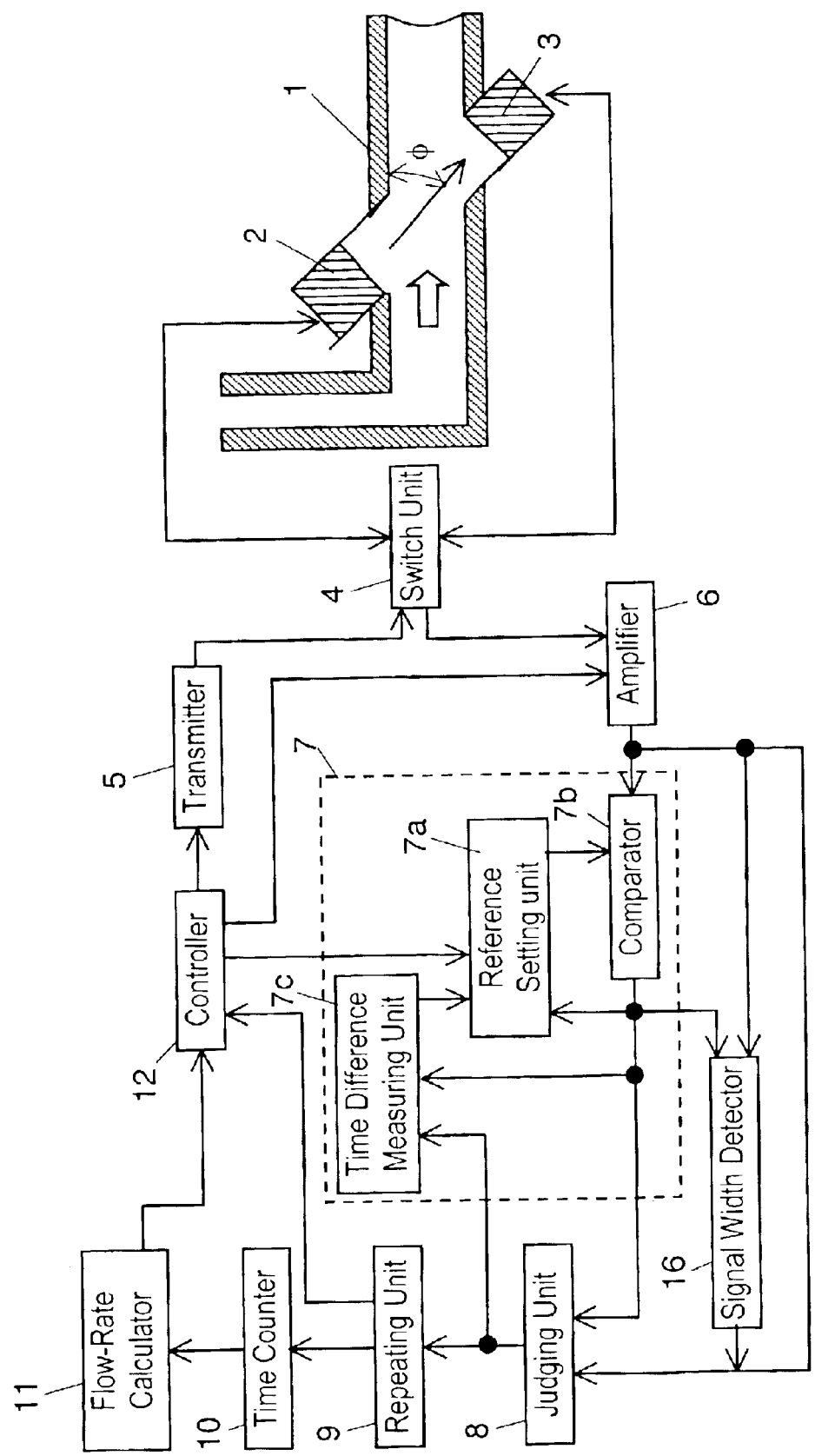
FIG. 17 is a block diagram of a flow meter according to exemplary embodiment 6 of the invention.
Figure 18:
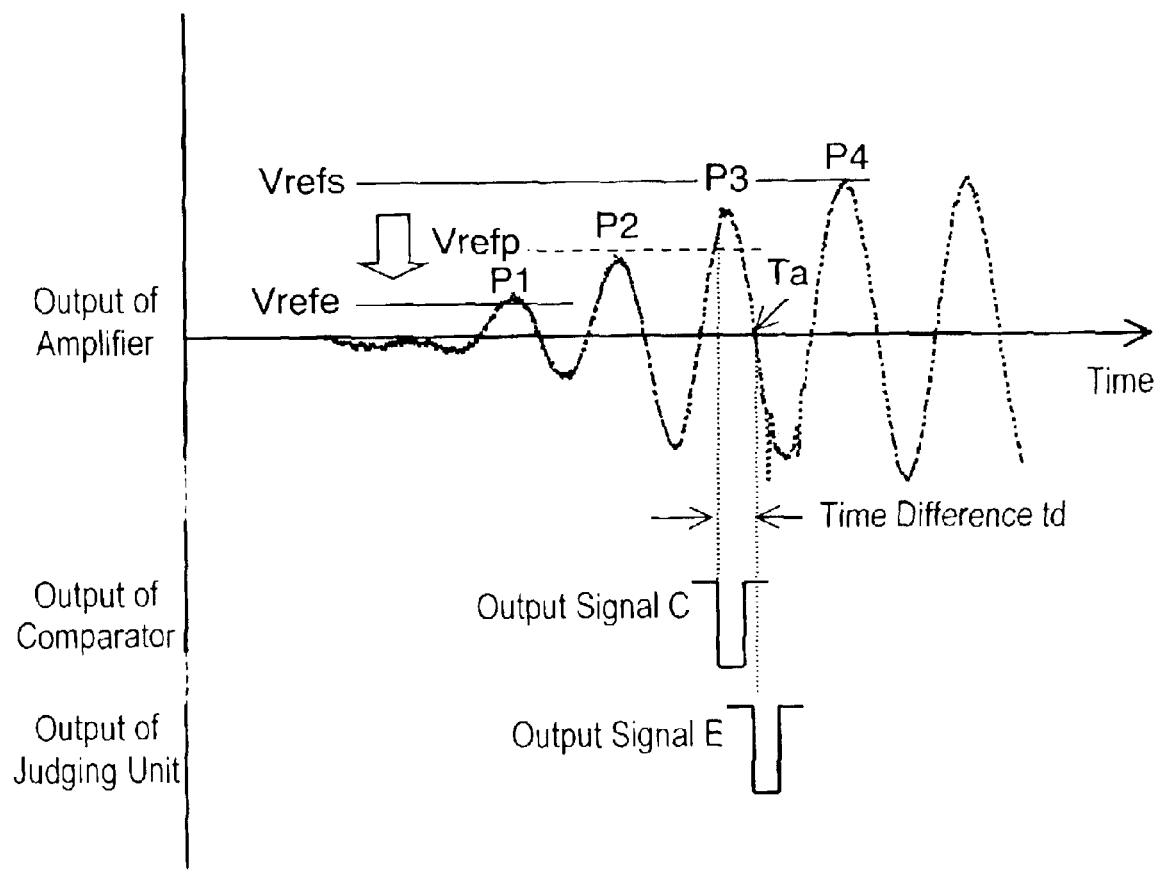
FIG. 18 is an explanatory view for illustrating an operation of the flow meter of embodiment 6.
Figure 19:
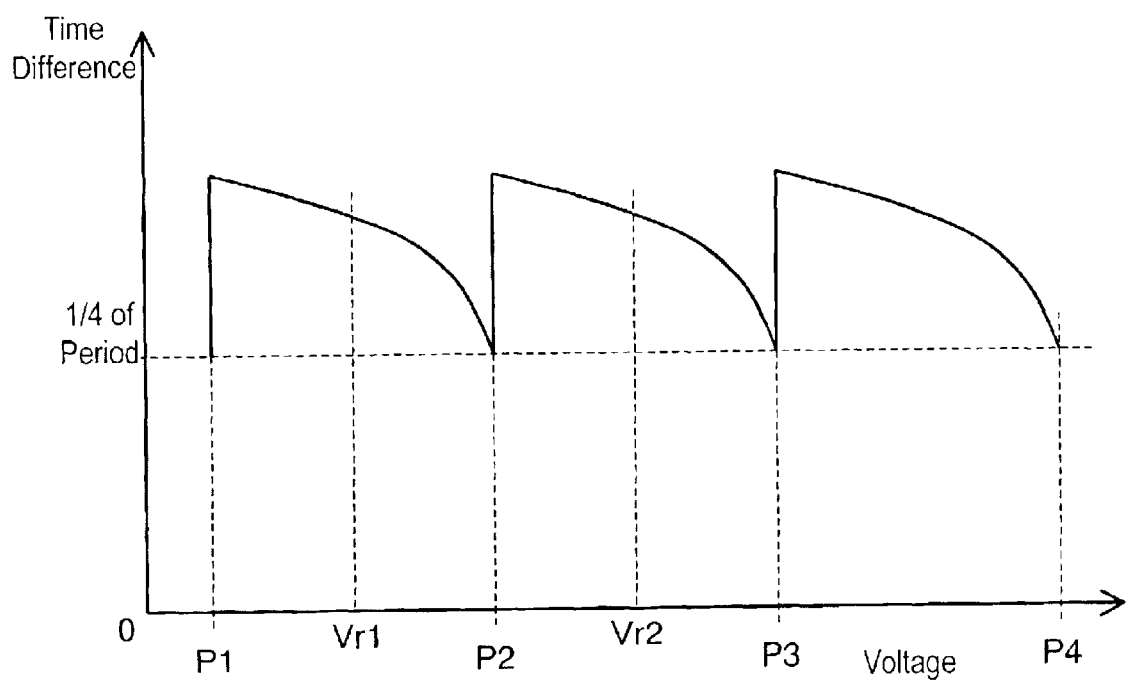
FIG. 19 is an explanatory view for illustrating an operation of the flow meter of embodiment 6.
Figure 20:
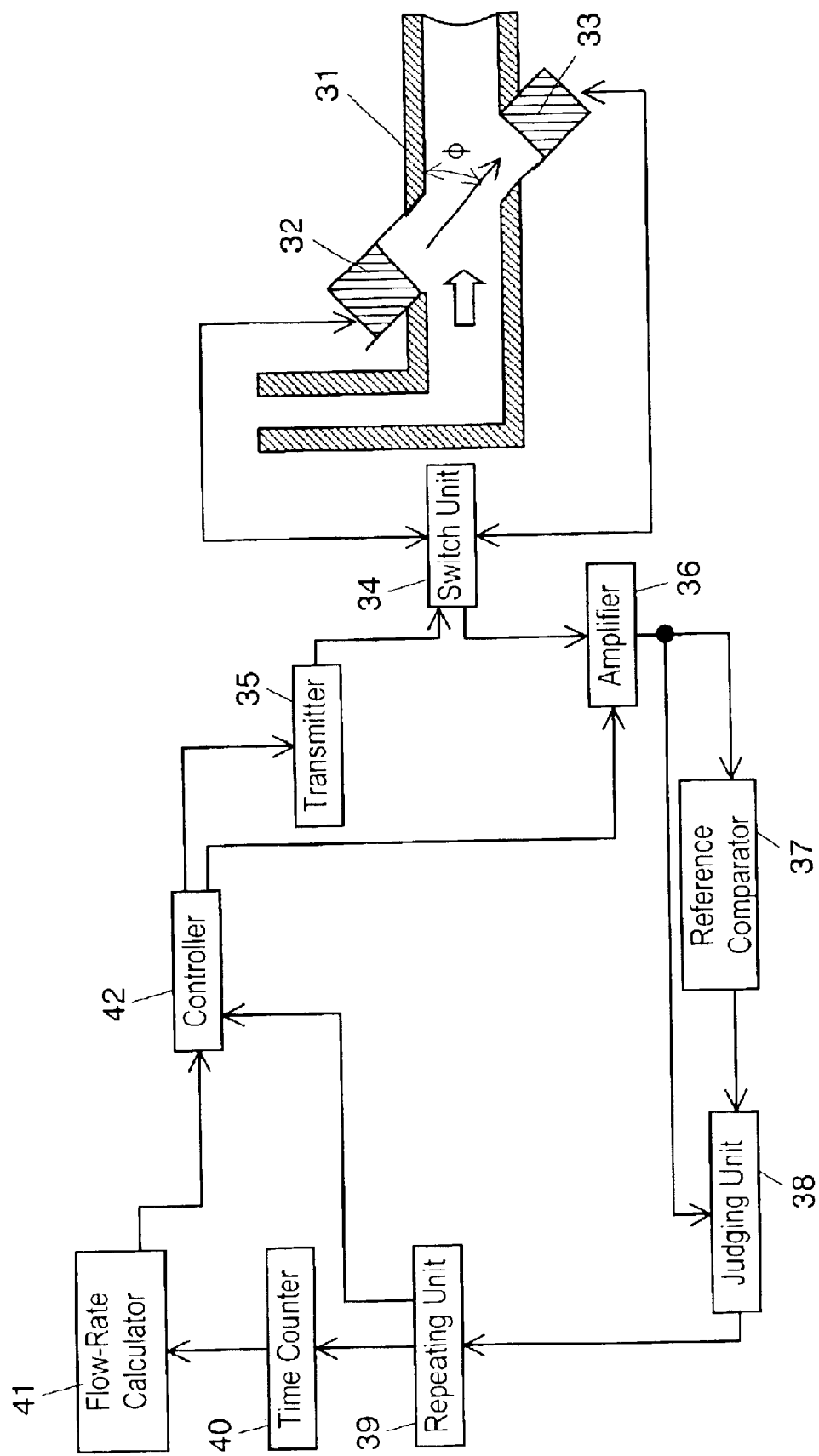
FIG. 20 is a block diagram of a conventional flow meter.
Figure 21:
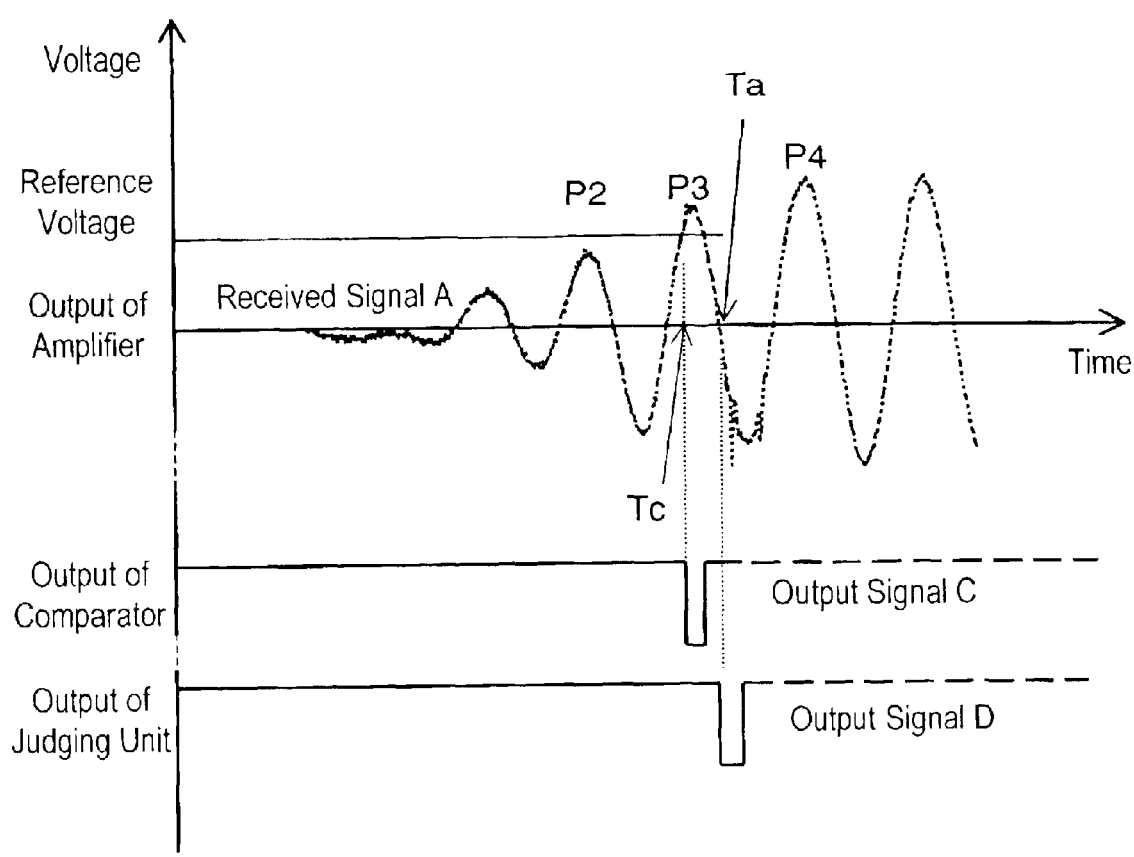
FIG. 21 is an explanatory view for illustrating an operation of the conventional flow meter.

FIG. 17 is a block diagram of a flow meter according to exemplary embodiment 6 of the present invention. FIGS. 18 and 19 illustrate an operation of the flow meter particularly for determining a reference voltage. As shown in FIG. 17, a reference setting unit 7a includes an electronic variable resistor for setting the reference voltage to a desired level or modifying the reference voltage. A comparator 7b compares the reference voltage determined by the reference setting unit 7a with the amplitude of a signal received by an ultrasonic wave oscillator at a receiving side. A time difference measuring unit 7c measures a time difference between respective signals output from the comparing unit 7b and the judging unit 8. Differently from other embodiments, the reference comparator 7 of embodiment 6 includes the reference setting unit 7a, the comparator 7b, and the time difference measuring unit 7c. A signal width detector 16 calculates an interval of time between two points in the signal output from the amplifier 6 after the reference comparator 7 outputs a signal. The other components are identical to those of Embodiment 3 and will be explained in no more detail.

An operation of the flow meter having the above arrangement will be described. The reference comparator 7 determines the reference voltage through the following steps. A controller 12 drives the reference comparator 7 to start an initial setting of the reference voltage upon being turned on and to change the reference voltage when the flow-rate calculator 11 produces an error output or when the judging unit 8 fails to detect the arrival of the ultrasonic wave. When receiving a command from the controller 12, the reference comparator 7 is set to a mode for determining the reference voltage, and the reference setting unit 7a sets the reference voltage near a peak of the received signal amplified by the amplifier 6. More specifically, as shown in FIG. 18, if the fourth peak P4 is a peak as a whole of the received signal, the reference setting unit 7a set the reference voltage to a voltage Vref at the fourth peak P4. The reference setting unit 7a gradually decreases the reference voltage from the voltage Vref, and the time difference measuring unit 7c accordingly measures a time difference between the signal output from the comparing unit 7b and the signal output from the judging unit 8.

Assuming that the reference voltage Vref is denoted by a dotted line in FIG. 18, the judging unit 8 outputs a signal E which falls down at the first zero-crossing point Ta in time after the amplitude of the signal output from the amplifier 6 reaches the voltage Vref. Then, the time difference measuring unit 7c measures a time difference td between the signal E output from the judging unit 8 and the signal output from the comparing unit 7b.

FIG. 19 illustrates a profile of the time difference td measured by the time difference measuring unit 7c when the reference voltage is decreased. The difference td is ¼ of the period of the ultrasonic wave at peaks (the second peak P2, the third peak P3 . . . ) in the received signal. The time difference between the peaks becomes larger according to a decrease of the reference voltage.

The time difference td and the reference voltage are correlated with each other. The reference voltage is a voltage for each peak at which the time difference td is ¼ of the period of the ultrasonic wave to be received. Then, the reference setting unit 7a stores an intermediate voltage Vr2 between the second peak and the third peak and an intermediate voltage Vr1 between the first peak and the second peak, and then the mode for determining the reference voltage of the reference comparator 7 terminates.

If the third peak P3 in the received signal is used for detecting the arrival of the received, the controller 12 sets the reference voltage to the voltage Vr2 between the second peak P2 and the third peak P3, and starts measuring the flow rate. According to embodiment 6, the reference voltage is determined as being gradually decreased from its maximum at the peak after the gain of the amplifier 9 is adjusted. Alternatively, the reference voltage may, with equal success, be set to a desired level between any two adjacent peaks determined according to the time difference measured by the time difference measuring unit 7c, e.g., the second peak P2 and the third peak P3, as being gradually increased from the first peak P1, where the amplitude of the received signal is lowest.

According to embodiment 6, the reference voltage set to the intermediate voltage between the two peaks in the received signal, and the reference voltage may be determined similarly to embodiment 2 to a level between two specific peaks such that the level provides a large margin against a change of the amplitude of the received signal which is biased in (increasing or decreasing) aspect. More particularly, the reference voltage may be set to ⅓ of the amplitude between the two peaks adjacent to each other, as described in embodiment 2.

As set forth above, in the flow meter according to embodiment 6, the reference setting unit 7a determines and stores the reference voltage based on the time difference between the signal output from the comparing unit 7b and the signal output from the judging unit 8 measured by the time difference measuring unit 7c. The reference voltage is determined according to the actual signal of the ultrasonic wave, and is set to the optimum level, and therefore the flow meter of embodiment 6 calculates the flow rate of the fluid accurately.

What is claimed is:

1. A flow meter for measuring a flow rate of fluid flowing through a flow passage, said flow meter comprising:
   first and second oscillators provided across said flow passage for transmitting and receiving an ultrasonic wave;
   a transmitter for driving said first and second oscillators;
   a switching unit for switching transmission of said ultrasonic wave between said first and second oscillators;
   an amplifier for amplifying a signal received from said first and second oscillators;
   a flow-rate calculator for calculating said flow rate based on a duration of propagation of said ultrasonic wave between said first and second oscillators;
   a reference comparator for comparing a voltage of said amplified signal with a reference voltage to output a signal which indicates a time point where a relationship between said voltage of said amplified signal and said reference voltage changes;
   a judging unit for detecting an arrival time of said ultrasonic wave at said first and second oscillators based on said signal output from said reference comparator and said signal output from said amplifier to output a signal which indicates said arrival time; and
   a reference setting unit including
      a propagation measuring unit for measuring a duration of propagation of said ultrasonic wave along said flow passage from a start of transmission of said ultrasonic wave to said arrival time detected by said judging unit, and
      a voltage setting unit for determining said reference voltage based on said duration of propagation and for said reference voltage to said reference comparator.

2. The flow meter according to claim 1,
   wherein said reference setting unit further includes a time difference measuring unit for measuring a time difference between said signal output from of said reference comparator and said signal output from said judging unit, and
   wherein said voltage setting unit determines said reference voltage based on a signal output from said time difference measuring unit.

3. The flow meter according to claim 2, wherein said reference setting unit determines said reference voltage based on a plurality of inflection points where said time difference measured by said time difference measuring unit significantly varies according to a change of said reference voltage.

4. The flow meter according to claim 3, wherein said reference setting unit determines said reference voltage between two inflection points of said plurality of inflection points most distanced from each other.

5. The flow meter according to claim 4, wherein said reference setting unit determines said reference voltage at a middle between said two inflection points.

6. The flow meter according to claim 3, wherein said reference setting unit changes said reference voltage when said time difference measured by said time difference measuring unit is out of a predetermined range.

7. The flow meter according to claim 3, wherein said reference setting unit determines said reference voltage when said time difference measured by said time difference measuring unit according to a change of said reference voltage from a minimum to a maximum of a range of said reference voltage contain both a maximum and a minimum of a predetermined range of said time difference.

8. The flow meter according to claim 3, wherein said reference setting unit changes said reference voltage when said time difference measured by said time difference measuring unit according to a change of said reference voltage from a minimum to a maximum of said reference voltage is out of a predetermined rage a predetermined number of times.

9. The flow meter according to claim 3, wherein, when a difference between time differences measured by said time difference measuring unit at transmission of said ultrasonic wave in two opposite directions becomes larger than a predetermined level, said reference voltage is determined for each of said directions.

10. A flow meter for measuring a flow rate of fluid flowing through a flow passage, said flow meter comprising:
    first and second oscillators provided across said flow passage for transmitting and receiving an ultrasonic wave;
    a transmitter for driving said first and second oscillators;
    a switching unit for switching transmission of said ultrasonic wave between said first and second oscillators;
    an amplifier for amplifying a signal received by said first and second oscillators;
    a flow-rate calculator for calculating said flow rate based on a duration of propagation of said ultrasonic wave between said first and second oscillators;
    a reference comparator for comparing a voltage of said amplified signal with a reference voltage to output a signal which indicates a time point where a relationship between said voltage of said amplified signal and said reference voltage changes;
    a judging unit for detecting an arrival time of said ultrasonic wave at said first and second oscillators based on said signal output from said reference comparator and said signal output from said amplifier to output a signal which indicates said arrival time; and
    a reference setting unit for determining said reference voltage based on said signal output from said reference comparator according to a change of said reference voltage.

11. A flow meter for measuring a flow rate of fluid flowing through a flow passage, said flow meter comprising:
    first and second oscillators provided across said flow passage for transmitting and receiving an ultrasonic wave;
    a transmitter for driving said first and second oscillators;
    a switching unit for switching transmission of said ultrasonic wave between said first and second oscillators;

an amplifier for amplifying a signal received by said first and second oscillators;

a flow-rate calculator for calculating said flow rate based on a duration of propagation of said ultrasonic wave between said first and second oscillators;

a reference comparator for comparing a voltage of said amplified signal with a reference voltage to output s signal which indicates a time point where a relationship between said voltage of said amplified signal and said reference voltage changes;

a judging unit for detecting an arrival time of said ultrasonic wave at said first and second oscillators based on said signal output from said reference comparator and said signal output from said amplifier to output a signal which indicates said arrival time;

a time difference measuring unit for measuring a time difference between said signal output from said reference comparing unit and said signal output from said judging unit; and a reference setting unit for determining said reference voltage based on said time difference measured by said time difference measuring unit as said reference voltage is gradually decreased from a level near a peak of said amplified signal.

* * * * *

UNITED STATES PATENT AND TRADEMARK OFFICE
CERTIFICATE OF CORRECTION

PATENT NO. : 6,772,643 B2
DATED : August 10, 2004
INVENTOR(S) : Eguchi et al.

It is certified that error appears in the above-identified patent and that said Letters Patent is hereby corrected as shown below:

<u>Title page,</u>
Item [75], Inventors, "Shuji Ab" should read -- Shuji Abe --.

Signed and Sealed this

Twenty-third Day of August, 2005

JON W. DUDAS
*Director of the United States Patent and Trademark Office*